US012625925B2

(12) United States Patent
Umeda et al.

(10) Patent No.: US 12,625,925 B2
(45) Date of Patent: May 12, 2026

(54) STORAGE MEDIUM, ESTIMATION METHOD, AND INFORMATION PROCESSING DEVICE, RELEARNING PROGRAM, AND RELEARNING METHOD

(71) Applicant: FUJITSU LIMITED, Kawasaki (JP)

(72) Inventors: Yuhei Umeda, Kawasaki (JP); Takashi Katoh, Kawasaki (JP); Yuichi Ike, Kawasaki (JP); Mari Kajitani, Fukuoka (JP); Masatoshi Takenouchi, Hadano (JP)

(73) Assignee: Fujitsu Limited, Kawasaki (JP)

( * ) Notice: Subject to any disclaimer, the term of this patent is extended or adjusted under 35 U.S.C. 154(b) by 1009 days.

(21) Appl. No.: 17/723,599

(22) Filed: Apr. 19, 2022

(65) Prior Publication Data

US 2022/0237407 A1     Jul. 28, 2022

Related U.S. Application Data

(63) Continuation of application No. PCT/JP2019/041581, filed on Oct. 23, 2019.

(51) Int. Cl.
*G06F 16/28* (2019.01)
*G06F 16/35* (2025.01)
(Continued)

(52) U.S. Cl.
CPC ........ *G06F 18/2321* (2023.01); *G06F 16/285* (2019.01); *G06F 16/35* (2019.01);
(Continued)

(58) Field of Classification Search
CPC ............... G06F 18/2321; G06F 18/217; G06F 18/2411; G06F 18/2431; G06F 18/2155; G06F 18/2323; G06N 20/00
See application file for complete search history.

(56) References Cited

U.S. PATENT DOCUMENTS

| | | | | |
|---|---|---|---|---|
| 5,124,932 A | * | 6/1992 | Lodder | ................ G01N 21/359 702/30 |
| 7,542,954 B1 | * | 6/2009 | Syeda-Mahmood | .. G06N 20/00 706/62 |

(Continued)

FOREIGN PATENT DOCUMENTS

CN          104156438 A  *  11/2014   ........... G06K 9/6259

OTHER PUBLICATIONS

L. McInnes and J. Healy, "Accelerated Hierarchical Density Based Clustering," 2017 IEEE International Conference on Data Mining Workshops (ICDMW), New Orleans, LA, USA, 2017, pp. 33-42, doi: 10.1109/ICDMW.2017.12 (Year: 2017).*

(Continued)

*Primary Examiner* — Dennis Truong
(74) *Attorney, Agent, or Firm* — Fujitsu Intellectual Property Center

(57)          ABSTRACT

A non-transitory computer-readable storage medium storing an estimation program that causes a computer to execute a process includes specifying representative points of each of training clusters that corresponds to each of labels targeted for estimation; setting boundaries between each of input clusters under a condition that a number of the input clusters and a number of the representative points coincide with each other, the input clusters being generated by clustering in a feature space for input data; acquiring estimation results for the labels with respect to the input data based on a correspondence relationship between the input clusters and the training clusters based on the boundaries; and estimating determination accuracy for the labels by using the machine learning model with respect to the input data based on the estimation results.

10 Claims, 25 Drawing Sheets

(51) Int. Cl.

| | | |
|---|---|---|
| *G06F 18/21* | (2023.01) | |
| *G06F 18/2321* | (2023.01) | |
| *G06F 18/2411* | (2023.01) | |
| *G06F 18/2431* | (2023.01) | |
| *G06N 20/00* | (2019.01) | |

(52) U.S. Cl.

CPC ........ *G06F 18/217* (2023.01); *G06F 18/2411* (2023.01); *G06F 18/2431* (2023.01); *G06N 20/00* (2019.01)

(56) References Cited

U.S. PATENT DOCUMENTS

| | | | | |
|---|---|---|---|---|
| 11,868,851 | B2 * | 1/2024 | Carlsson | ............. G06F 11/3048 |
| 2003/0046297 | A1 * | 3/2003 | Mason | ..................... G06F 18/24 |
| | | | | 707/999.102 |
| 2005/0234955 | A1 * | 10/2005 | Zeng | ..................... G06F 16/355 |
| 2015/0120639 | A1 * | 4/2015 | Shin | ........................ G06N 20/00 |
| | | | | 706/46 |
| 2015/0161230 | A1 * | 6/2015 | Alkov | ............... G06F 16/24578 |
| | | | | 707/748 |

OTHER PUBLICATIONS

A. Moitra, N. O. Malott and P. A. Wilsey, "Cluster-based Data Reduction for Persistent Homology," 2018 IEEE International Conference on Big Data (Big Data), Seattle, WA, USA, 2018, pp. 327-334, (Year: 2018).*

A. Smiti and Z. Elouedi, "DBSCAN-GM: An improved clustering method based on Gaussian Means and DBSCAN techniques," 2012 IEEE 16th International Conference on Intelligent Engineering Systems (INES), Lisbon, Portugal, 2012, pp. 573-578, doi: 10.1109/INES.2012.6249802. (Year: 2012).*

G. Wu, H. Zhang, Y. He, X. Bao, L. Li and X. Hu, "Learning Kullback-Leibler Divergence-Based Gaussian Model for Multivariate Time Series Classification," in IEEE Access, vol. 7, pp. 139580-139591, 2019, doi: 10.1109/ACCESS.2019.2943474. (Year: 2019).*

P. Spurek and W. PaÅka, "Clustering of Gaussian distributions," 2016 International Joint Conference on Neural Networks (IJCNN), Vancouver, BC, Canada, 2016, pp. 3346-3353, doi: 10.1109/IJCNN.2016.7727627. (Year: 2016).*

P. Mitra, C. A. Murthy and S. K. Pal, "Density-based multiscale data condensation," in IEEE Transactions on Pattern Analysis and Machine Intelligence, vol. 24, No. 6, pp. 734-747, Jun. 2002, doi: 10.1109/TPAMI.2002.1008381. (Year: 2002).*

Aktas, M.E., Akbas, E. & Fatmaoui, A.E. Persistence homology of networks: methods and applications. Appl Netw Sci 4, 61 (2019). https://doi.org/10.1007/s41109-019-0179-3 (Year: 2019).*

Jakob Verbeek; "Clustering with k-means and Gaussian mixture distributions"; Machine Learning and Object Recognition; https://lear.inrialpes.fr/~verbeek/mlor.slides. 16.17/1.kmeans_mog.pdf 2016-2017 (Year: 2017).*

Yao, Yukai, et al. "K-SVM: An Effective SVM Algorithm Based on K-means Clustering." J. Comput. 8.10 (2013): 2632-2639. (Year: 2013).*

Extended European Search Report dated Oct. 26, 2022 for corresponding European Patent Application No. 19949698.5, 12 pages. *Please note NPL Tegjyot Singh Sethi et al., "On the reliable detection of concept drift from streaming unlabeled data," cited herewith was previously cited in an IDS filed on Apr. 19, 2022.*.

Yukai Yao et al., "K-SVM: An Effective SVM Algorithm Based on K-means Clustering", Journal of Computers, vol. 8, No. 10, Oct. 31, 2013, XP055971666, FI, ISSN: 1796-203X, DOI:10.4304/jcp.8.10. 2632-2639, Retrieved from the Internet: URL:http://www.jcomputers.us/vol8/jcp0810-25.pdf> cited in EESR mailed on Oct. 26, 2022 for corresponding European Patent Application No. 19949698.5.

Mouchaweh, M. Sayed, "Semi-supervised classification method for dynamic applications", Fuzzy Sets and Systems, Elsevier, Amsterdam, NL, vol. 161, No. 4, Feb. 16, 2010, pp. 544-563, XP026815150, ISSN: 0165-0114, [retrieved on Nov. 10, 2009].

Tegjyot, Singh Sethi et al., "On the reliable detection of concept drift from streaming unlabeled data", Expert Systems With Applications, Elsevier, Amsterdam, NL, vol. 82, Apr. 4, 2017, pp. 77-99, XP029998009, ISSN: 0957-4174, DOI: 10.1016/J.ESWA.2017.04. 008. (Please note the pre-print version of this NPL was cited previously in and IDS filed on Apr. 19, 2022.).

Tegiyot Singh Sethi et al., "On the Reliable Detection of Concept Drift from Streaming Unlabeled Data", arXiv:1704.00023v1 [stat. ML], Mar. 31, 2017, pp. 1-29 [online] https://arxiv.org/abs/1704. 00023 (Total 29 pages).

Yusuke Sakamoto et al., "Initial Experiment to Detect Concept Drift on Adaptive Monitoring System", The Japanese Society for Artificial Intelligence(JSAI), SIG-KBS-B401-05, Materials of the 102nd of Special Interest Group on Knowledge-Based Systems, pp. 26-33, Jul. 24, 2014 (Total 10 pages) (Cited in ISR).

Youngin Kim et al., "An Efficient Concept Drift Detection Method for Streaming Data under Limited Labeling", Computer Science, IEICE Transactions 2017, DOI: 10.1587/transinf.2017edp7091, IEICE Trans. Inf. & Syst., vol. E100-D, No. 10, Oct. 2017, pp. 2537-2546 [retrieval date Dec. 17, 2019] (Total 11 pages) [online] https://www.semanticscholar.org/paper/An-Efficient-Concept-Drift-Detection-Method-for-Kim-Park/f1529d882477b8310311bec06de6b9abec982327.

International Search Report and Written Opinion of the International Searching Authority (Form PCT/ISA/210, 220, and 237), mailed in connection with PCT/JP2019/041581 and mailed Jan. 7, 2019 (Total 10 pages).

EPOA—European Office Action dated Mar. 20, 2025 for corresponding European Patent Application No. 19949698.5 [7 pages]. **Non-patent literature documents cited in the EPOA were previously filed in the IDS on Apr. 19, 2022 and Jan. 25, 2023.

* cited by examiner

FIG. 6

| DATA ID | INPUT DATA |
|---------|------------|
| 01 | INPUT DATA 1 |
| ... | ... |

FIG. 7

| DATA ID | INPUT DATA | DETERMINATION RESULT |
|---------|-----------|----------------------|
| 01 | INPUT DATA 1 | CLASS A |
| ... | ... | ... |

FIG. 8

| DATA ID | INPUT DATA | ESTIMATION RESULT (CLASS A, CLASS B, CLASS C) |
|---------|------------|-----------------------------------------------|
| 01 | INPUT DATA 1 | (1,0,0) |
| 02 | INPUT DATA 2 | (0.4,0,0.6) |
| ... | ... | ... |

NUMBER OF CLUSTERS OF TWO AND
COORDINATES OF TWO POINTS ARE RECORDED

FIG. 10

RADIUS: 0

RADIUS: $r_1$

RADIUS: $r_2$

RADIUS: $r_3$

MATRIX A OF DETERMINATION
RESULTS OF MACHINE
LEARNING MODEL

MATRIX B OF
ESTIMATION RESULTS

|  | CLASS A | CLASS B | CLASS C |  | CLASS A | CLASS B | CLASS C |
|---|---|---|---|---|---|---|---|
| INPUT DATA 1 | 1 | 0 | 0 |  | 1 | 0 | 0 |
| INPUT DATA 2 | 0 | 1 | 0 |  | 0.5 | 0.5 | 0 |
| INPUT DATA 3 | 0 | 0 | 1 |  | 0 | 1 | 0 |
| INPUT DATA 4 | 1 | 0 | 0 |  | 0.4 | 0 | 0.6 |
| ⋮ | ⋮ | ⋮ | ⋮ |  | ⋮ | ⋮ | ⋮ |

⇩

$\Sigma$((MATRIX A) $\otimes$ (MATRIX B))/NUMBER OF PIECES OF DATA
ELEMENT PRODUCTS

⇩

ESTIMATION ACCURACY

MATRIX B OF
ESTIMATION RESULTS

|  | CLASS A | CLASS B | CLASS C |
|---|---|---|---|
| INPUT DATA 1 | 1 | 0 | 0 |
| INPUT DATA 2 | 0.5 | 0.5 | 0 |
| INPUT DATA 3 | 0 | 1 | 0 |
| INPUT DATA 4 | 0.4 | 0 | 0.6 |
| ⋮ | ⋮ | ⋮ | ⋮ |

| EXPLANATORY VARIABLE | OBJECTIVE VARIABLE |
|---|---|
| INPUT DATA 1 | 1,0,0 |
| INPUT DATA 2 | 0.5,0.5,0 |
| ... | ... |

1

STORAGE MEDIUM, ESTIMATION METHOD, AND INFORMATION PROCESSING DEVICE, RELEARNING PROGRAM, AND RELEARNING METHOD

CROSS-REFERENCE TO RELATED APPLICATION

This application is a continuation application of International Application PCT/JP2019/041581 filed on Oct. 23, 2019 and designated the U.S., the entire contents of which are incorporated herein by reference.

FIELD

The present invention relates to a storage medium, an estimation method, and an information processing device, a retraining program, and a retraining method.

BACKGROUND

Conventionally, a machine learning model (hereinafter, sometimes simply referred to as a "model") using machine learning that performs data discrimination and classification functions and the like has been used. Since the machine learning model performs discrimination and classification in line with trained teacher data, the accuracy of the machine learning model deteriorates when the tendency (data distribution) of input data changes during operation.

For such a reason, it is common to perform maintenance work to properly restore the model. For example, accuracy deterioration of the machine learning model is suppressed by labeling data at regular intervals, measuring the model accuracy attributable to the labeled data, and performing retraining when the accuracy falls below a certain accuracy. In this approach, when the input data is data for which correct answer information can be acquired after the prediction result by the machine learning model is obtained, such as weather forecast and stock price prediction, a low cost of labeling for retraining is involved. However, in the case of data for which it is infeasible to acquire correct answer information, labeling for retraining involves a higher cost.

In recent years, a technique of clustering feature spaces, which represent information organized by removing unwanted data from the input data and in which the machine learning model classifies the input data that has been input, making labels correspondent with each cluster, and automatically labeling input data with the result of the correspondence as correct answer information (labels) has been known.

Non-Patent Document 1: Sethi, Tegjyot Singh, and Mehmed Kantardzic, "*On the reliable detection of concept drift from streaming unlabeled data*", Expert Systems with Applications 82 (2017).

SUMMARY

According to an aspect of the embodiments, a non-transitory computer-readable storage medium storing an estimation program that causes at least one computer to execute a process, the process includes specifying representative points of each of training clusters that corresponds to each of labels targeted for estimation, the training clusters being generated by clustering in a feature space for training data used for training of a machine learning model that estimates the labels according to input data; setting boundaries between each of input clusters under a condition that a number of the input clusters and a number of the representative points coincide with each other, the input clusters being generated by clustering in a feature space for input data; acquiring estimation results for the labels with respect to the input data based on a correspondence relationship between the input clusters and the training clusters based on the boundaries; and estimating determination accuracy for the labels by using the machine learning model with respect to the input data based on the estimation results.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of information stored in an input data database (DB).

FIG. 7 is a diagram illustrating an example of information stored in a determination result DB.

FIG. 8 is a diagram illustrating an example of information stored in an estimation result DB.

FIG. 10 is a diagram explaining clustering under operation.

FIG. 14 is a diagram explaining a matching process.

FIG. 17 is a diagram explaining deterioration determination for model accuracy.

FIG. 18 is a diagram explaining details of the determination of the model accuracy.

DESCRIPTION OF EMBODIMENTS

In the above clustering technique, clustering is sometimes not performed properly such that labeling for retraining is allowed. In this case, a reduction in the processing cost involved in retraining is not enabled, and it is difficult to suppress deterioration of the accuracy.

For example, since clustering is not every time conducted in the same manner as the boundary planes (determination rule) of each label in the feature space after training (at the start of operation), an event in which the labels are not allowed to be determined automatically occurs when clustering across the boundary planes is executed. In this case, labeling is performed by hand, and the processing load is rather higher. In addition, since the number of labels and the number of clusters do not coincide with each other every time and it is also difficult to define the number of clusters in advance, labeling is not every time allowed to be executed using the clustering result as it is.

In one aspect, it is an object to provide an estimation program, an estimation method, an information processing device, a retraining program, and a retraining method capable of suppressing the accuracy deterioration of a machine learning model.

According to one embodiment, the accuracy deterioration of a machine learning model may be suppressed.

Hereinafter, embodiments of an estimation program, an estimation method, an information processing device, a retraining program, and a retraining method according to the present invention will be described in detail with reference to the drawings. Note that these embodiments do not limit the present invention. Furthermore, each of the embodiments may be appropriately combined within a range without inconsistency.

First Embodiment

[Description of Performance Estimation Device]

Figure 1:
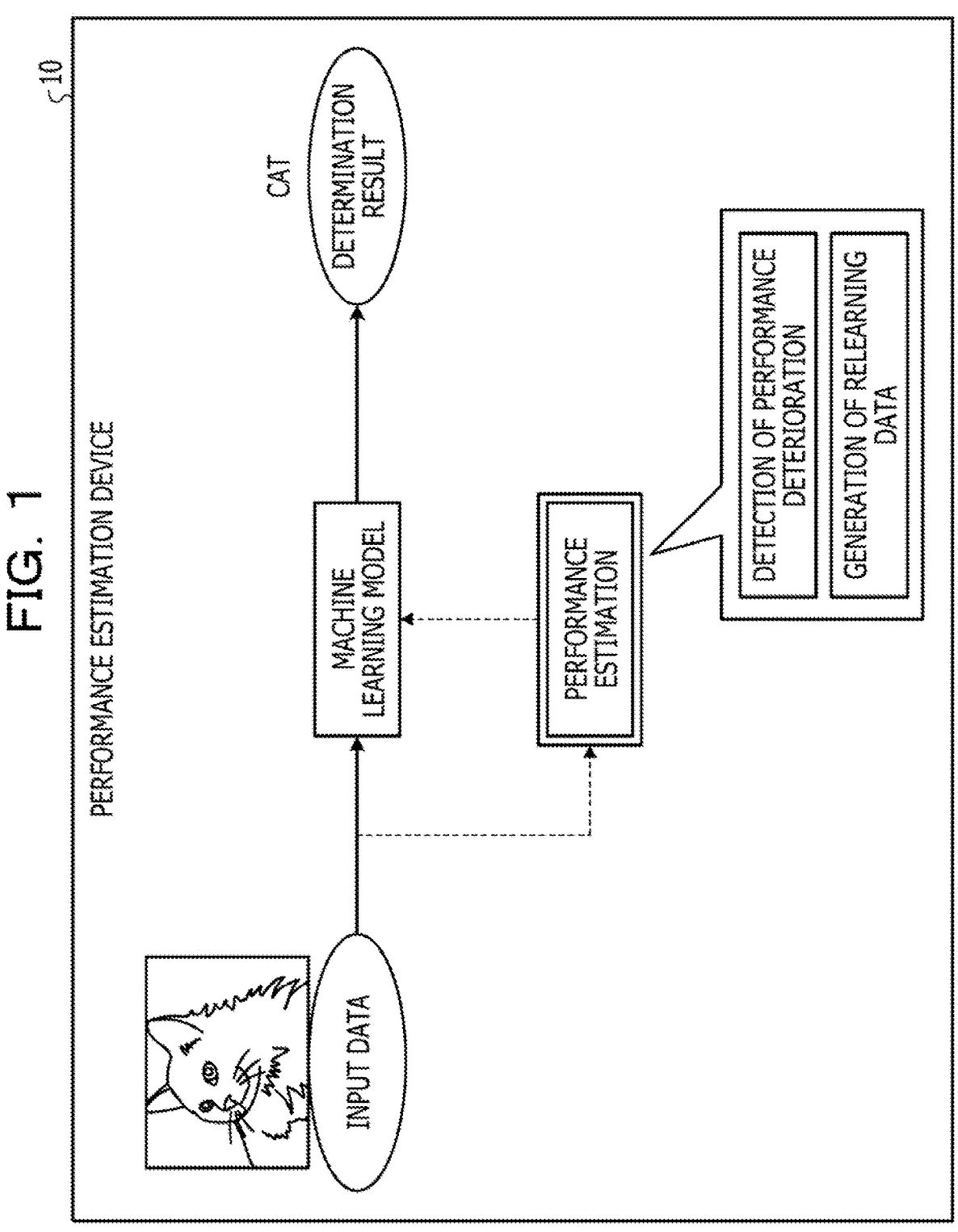
FIG. 1 is a diagram explaining a performance estimation device according to a first embodiment.

FIG. 1 is a diagram explaining a performance estimation device 10 according to a first embodiment. As illustrated in FIG. 1, the performance estimation device 10 is an example of a computer device that monitors the accuracy state of a trained machine learning model while executing determination (classification) of input data using the machine learning model and suppresses the accuracy deterioration of the machine learning model by performing retraining when detecting the accuracy deterioration.

For example, the machine learning model is an example of an image classifier that is trained using training data of which the explanatory variable is image data and the objective variable is an animal name at the time of training and outputs a determination result such as "cat" when the image data is input as input data at the time of operation. Note that the machine learning model is not limited to the image classifier, and a variety of machine learning models that output labels (determination results) with respect to the input data can be applied.

Here, since the machine learning model trained by machine learning, deep learning, or the like is trained on the basis of the combination of the training data and labeling, the machine learning model functions only within the range included in the training data. Meanwhile, the machine learning model is supposed to accept input of the same kind of data as at the time of training under operation, but in reality, there is a case where the state of data that has been input changes and the machine learning model does not function properly. For example, "the accuracy deterioration of the machine learning model" occurs.

The cause of the accuracy deterioration of the machine learning model is that a feature space immediately after training is properly divided by boundary planes as borders for each label, but when the deterioration happens, conversion to the feature space becomes improper, and movement to the region of a different label is made or clusters of a plurality of classes is connected.

In this case, maintenance work is desired to properly restore the machine learning model. For that purpose, the deterioration state of the machine learning model has to be grasped. For such a reason, an approach using the Kullback-Leibler (KL) distance or the confidence level is used as an approach for automatically detecting the accuracy deterioration of the machine learning model.

Figure 2:
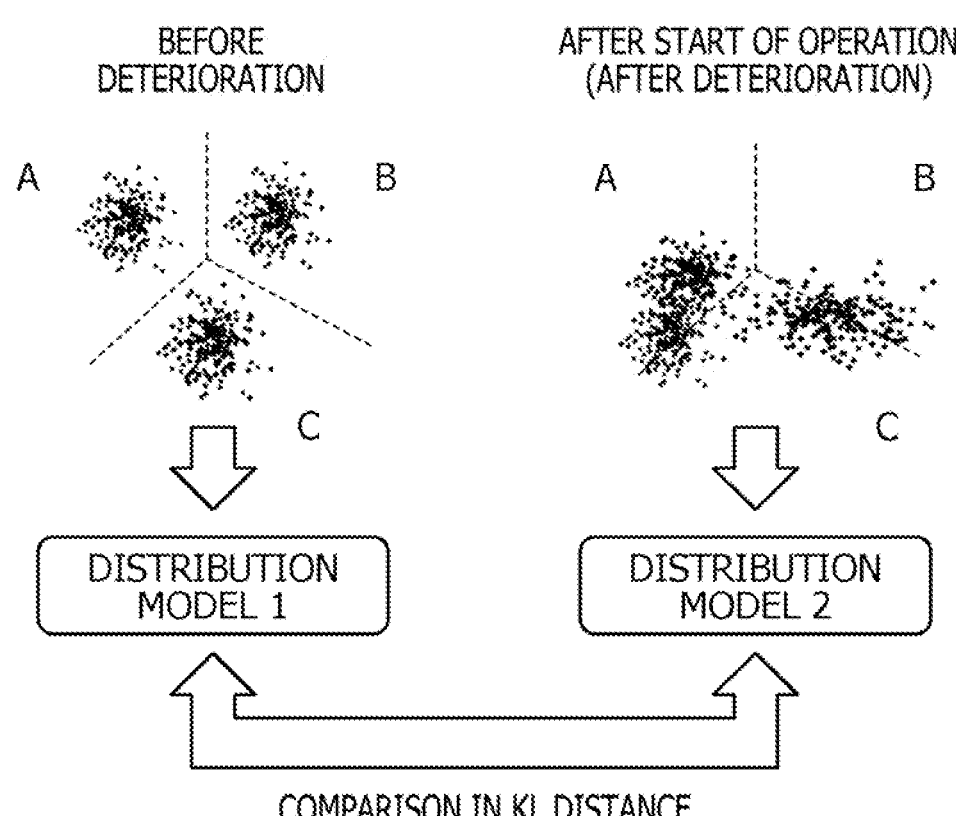
FIG. 2 is a diagram explaining general deterioration detection using a Kullback-Leibler (KL) distance.

FIG. 2 is a diagram explaining general deterioration detection using the KL distance. As illustrated in FIG. 2, a distribution model 1 of the feature space is held when the training data is determined (classified) at the training end stage before deterioration of the accuracy, and a distribution model 2 of the feature space when the input data targeted for determination is determined after the start of operation is periodically measured and held. Then, the KL distance between the distribution model 1 and the distribution model 2 is calculated, and when the calculated value is equal to or greater than a threshold value, the accuracy deterioration of the machine learning model is detected.

Figure 3:
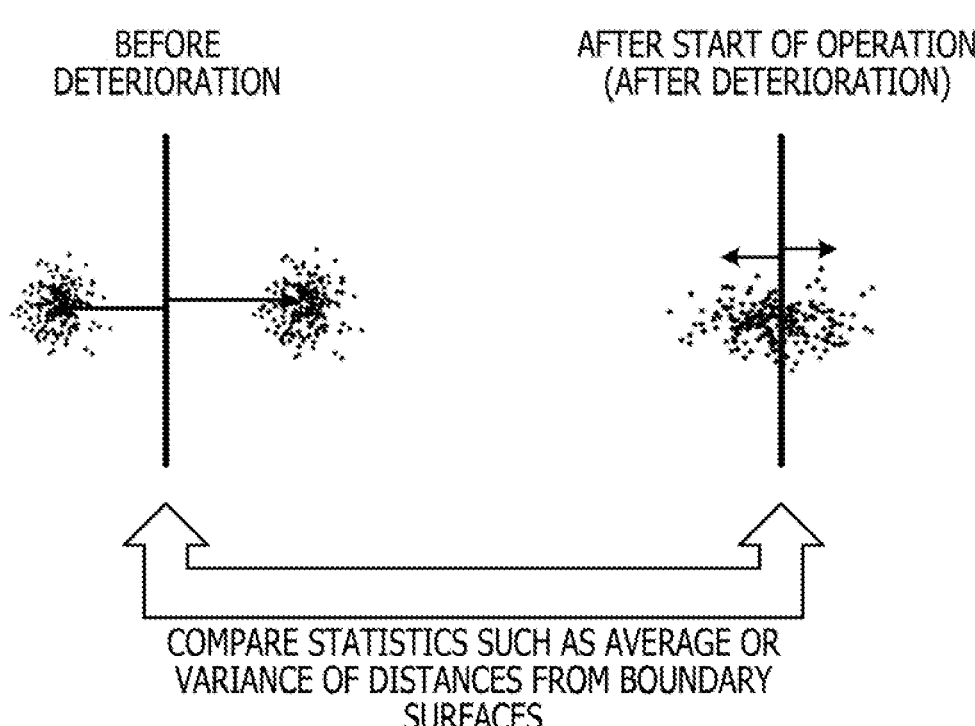
FIG. 3 is a diagram explaining general deterioration detection using a confidence level.

FIG. 3 is a diagram explaining general deterioration detection using the confidence level. Machine training can output the confidence level of determination as well. For example, in the case of deep learning, the value of the final layer is employed, and in the case of the support vector machine (SVM), the distance from the boundary surface is employed. In the case of the SVM, as illustrated in FIG. 3, statistics such as the average or variance of the distances from the boundary surfaces of each cluster are held when the training data is determined (classified) at the training end stage before deterioration of the accuracy, and statistics when the input data targeted for determination is determined after the start of operation are periodically measured and held. Then, the accuracy deterioration of the machine learning model is detected by, for example, comparing each statistic or comparing the statistics at the time of operation with a threshold value.

Such an approach using the KL distance or the confidence level is capable of detecting a change in a situation and accuracy deterioration, but is not capable of automatically restoring the machine learning model whose accuracy has deteriorated. In addition, it is often not possible to automatically grasp the label of data input at the time of actual operation. In that case, labeling has to be performed at the time of maintenance, which involves a high cost.

In recent years, an approach using clustering has been used as an approach for automatically detecting and restoring a machine learning model whose accuracy has deteriorated. Specifically, training data for retraining (hereinafter simply referred to as "retraining data") is automatically generated by clustering the feature spaces when the input data targeted for determination was determined after the start of operation, making labels correspondent with each cluster, and using the result of the correspondence as correct answer information.

Figure 4:
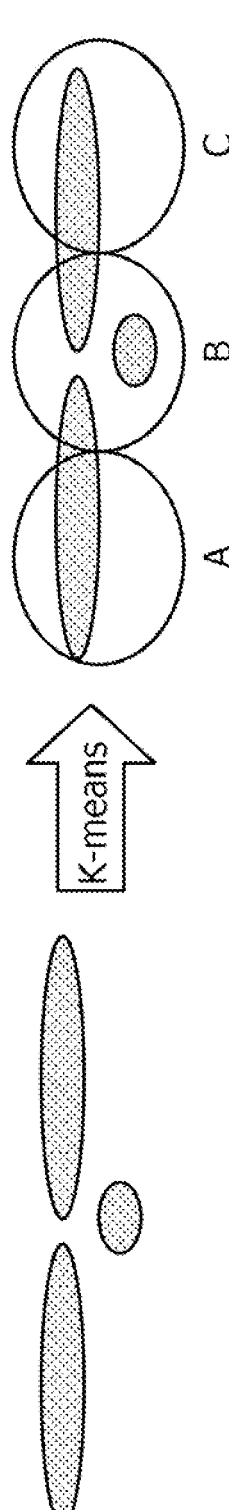
FIG. 4 is a diagram explaining a disadvantage in clustering.

However, it is not possible every time to cluster as expected. FIG. 4 is a diagram explaining a disadvantage in clustering. As illustrated in FIG. 4, when the K-means approach (K-means method) or the like is used, unintended clustering with ambiguous boundaries between clusters A, B, and C is executed, and an event in which it is difficult to give the correct answer information sometimes occurs. In addition, classification into the same number of clusters as the given labels is not obtained every time, and it is also not possible to set the number of clusters in advance. Therefore, it is difficult to automatically generate the retraining data.

Thus, in the performance estimation device 10 according to the first embodiment, by utilizing, as a feature of the distribution, the feature that a mass with the same label has (one or a plurality of) high density points and the density often decreases toward the outside of the distribution, proper clustering is performed even when cluster connection happens. In this manner, the performance estimation device 10 implements automatic detection of accuracy deterioration of the machine learning model and automatic generation of the retraining data using input data determined by the machine learning model and the determination result.

[Functional Configuration]

Figure 5:
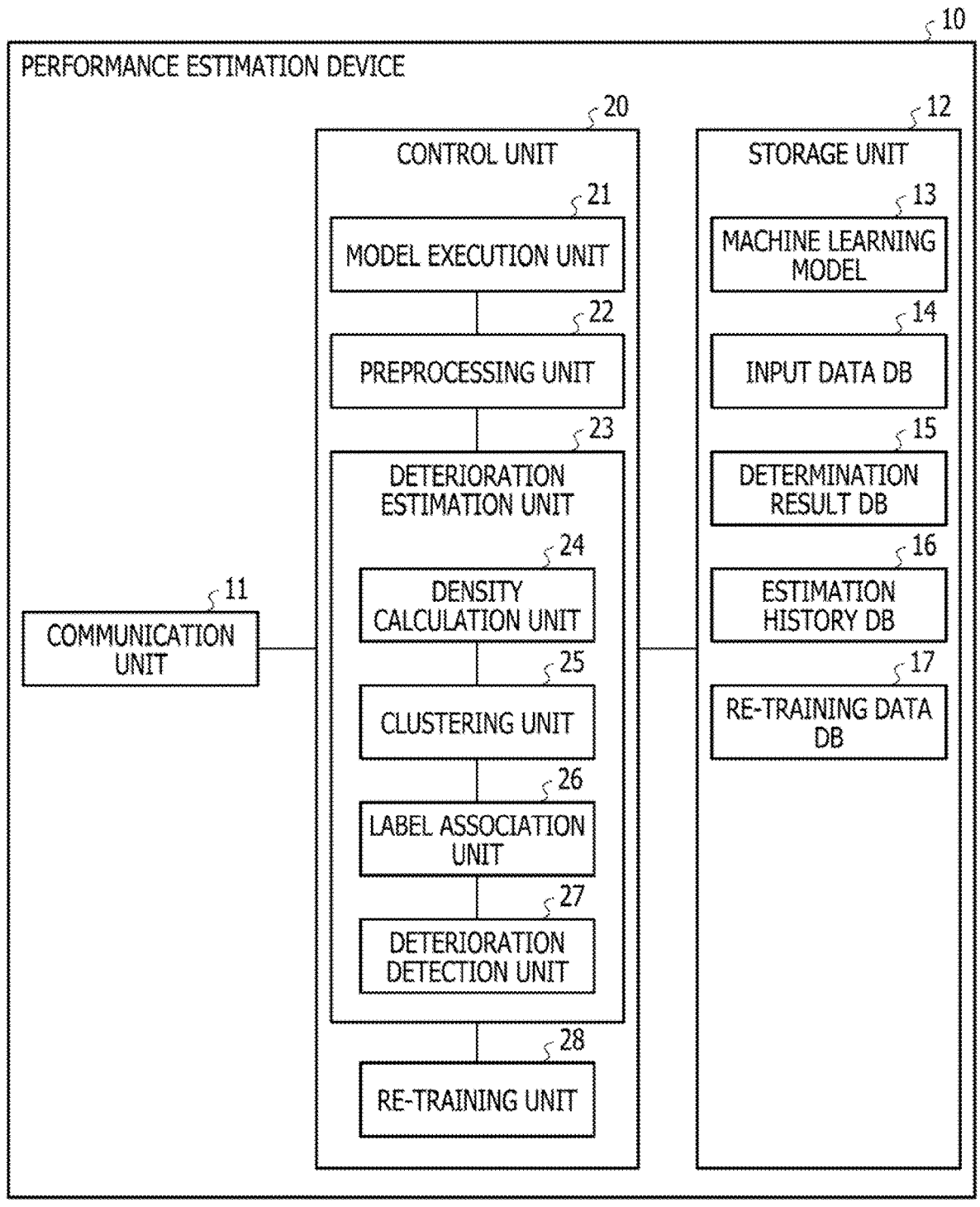
FIG. 5 is a functional block diagram illustrating a functional configuration of the performance estimation device according to the first embodiment.

FIG. 5 is a functional block diagram illustrating a functional configuration of the performance estimation device 10 according to the first embodiment. As illustrated in FIG. 5, the performance estimation device 10 includes a communication unit 11, a storage unit 12, and a control unit 20.

The communication unit 11 is a processing unit that controls communication with another device and, for example, is a communication interface or the like. For example, the communication unit 11 receives input data and receives various instructions from an administrator terminal.

The storage unit 12 is an example of a storage device that stores data and a program or the like executed by the control unit 20 and, for example, is a memory, a hard disk, or the like. This storage unit 12 stores a machine learning model 13, an input data DB 14, a determination result DB 15, an estimation history DB 16, and a retraining data DB 17.

In addition, the storage unit 12 can also store a data set of training data used for training of the machine learning model 13. For example, the storage unit 12 stores each piece of training data associated with identifiers that identify the training data, image data that serves as an explanatory variable, and a label (correct answer information) that serves as an objective variable.

The machine learning model 13 is a trained machine learning model that has been trained using training data. For example, this machine learning model 13 is an image classifier trained so as to output animal names such as a cat and a dog when the image data is input. Note that, in the first embodiment, the machine learning model 13 that conducts classification into three values of a class A, a class B, and a class C will be described as an example.

In addition, a neural network, the SVM, or the like can be adopted as the machine learning model 13. Note that the storage unit 12 can also store various trained parameters (optimized parameters) that can construct a trained machine learning model, instead of storing the whole machine learning model.

The input data DB 14 is a database that stores input data that is data to be input to the machine learning model 13. For example, the input data DB 14 stores data targeted for determination. FIG. 6 is a diagram illustrating an example of information stored in the input data DB 14. As illustrated in FIG. 6, the input data DB 14 stores "data identifier (ID), input data" in association with each other. The "data ID" stored here is an identifier that identifies data, and the "input data" is data targeted for determination.

The example in FIG. 6 indicates that the data ID=01 is assigned to input data 1. Note that it is also possible to further associate a feature amount that can be acquired from the input data. The feature amount includes an average value of pixel values of image data, a maximum value or minimum value among pixel values, a difference between a maximum value and a minimum value, and the like. In addition, the input data does not necessarily have to be stored and can be received like a data stream.

The determination result DB 15 is a database that stores determination results for the input data. For example, the determination result DB 15 stores determination results obtained by inputting the input data to the machine learning model 13. FIG. 7 is a diagram illustrating an example of information stored in the determination result DB 15. As illustrated in FIG. 7, the determination result DB 15 stores "data ID, input data, determination result" in association with each other.

The "data ID" stored here is an identifier that identifies the data, the "input data" is data targeted for determination, and the "determination result" is a determination result by the machine learning model 13. The example in FIG. 7 indicates that the input data 1 with the data ID=01 has been determined to fall under the "class A".

The estimation history DB 16 is a database that stores a history of estimation by a deterioration estimation unit 23, which will be described later. For example, the estimation history DB 16 stores the estimation result of the deterioration estimation unit 23 with respect to the input data, various types of information generated by the deterioration estimation unit 23 in order to detect deterioration, and the like.

FIG. 8 is a diagram illustrating an example of information stored in the estimation history DB 16. As illustrated in FIG. 8, the estimation history DB 16 stores "data ID, input data, estimation result (class A, class B, class C)". The "data ID" stored here is an identifier that identifies data, and the "input data" is data targeted for determination. The "estimation result" is an estimation result by the deterioration estimation unit 23 and indicates the probability (likelihood) of being relevant to each class.

The example in FIG. 8 indicates that the likelihood of falling under the class A has been determined to be "1", the likelihood of falling under the class B has been determined to be "0", and the likelihood of falling under the class C has been determined to be "0" with respect to the input data 1 with the data ID=01. In addition, it is indicated that the likelihood of falling under the class A has been determined to be "0.4", the likelihood of falling under the class B has been determined to be "0", and the likelihood of falling under the class C has been determined to be "0.6" with respect to input data 2 with the data ID=02.

The retraining data DB 17 is a database that stores retraining data used for retraining of the machine learning model 13. Specifically, when the accuracy deterioration of the machine learning model 13 occurs, the retraining data DB 17 stores training data at the time of retraining for recovering the accuracy of the machine learning model. Similar to the training data, the retraining data is data having an explanatory variable and an objective variable. Note that the details will be described later.

The control unit 20 is a processing unit that is in control of the entire performance estimation device 10 and, for example, is a processor or the like. This control unit 20 includes a model execution unit 21, a preprocessing unit 22, the deterioration estimation unit 23, and a retraining unit 28. Note that the model execution unit 21, the preprocessing unit 22, the deterioration estimation unit 23, and the retraining unit 28 are examples of electronic circuits included in the processor or the like and processes executed by the processor.

The model execution unit 21 is a processing unit that executes determination (classification) of the input data using the machine learning model 13. For example, the model execution unit 21 executes the actual operation using the machine learning model 13. For example, the model execution unit 21 inputs each piece of the input data stored in the input data DB 14 to the machine learning model 13 and acquires an output result of the machine learning model 13. Then, the model execution unit 21 stores the input data and the determination result based on the output result in the determination result DB 15 in association with each other. For example, the model execution unit 21 acquires the probability (likelihood) of each class as the output result of the machine learning model 13 and designates a class with the highest likelihood as the determination result.

The preprocessing unit 22 is a processing unit that acquires information regarding the feature space of the trained machine learning model 13 before the start of the operation. Specifically, the preprocessing unit 22 acquires information regarding the feature spaces before the determination by the model execution unit 21 starts and before the accuracy of the machine learning model 13 deteriorates and stores the acquired information in the storage unit 12.

For example, as a feature of the distribution of the feature amount by the machine learning model 13 that is still capable of accurately making determination, a mass with the same label has a high density point, and the density often decreases toward the outside of the distribution. In order to utilize this feature, the preprocessing unit 22 uses the Gauss density indicated by formula (1) to compute the Gauss density corresponding to the density of each piece of data in the feature space in a pre-deterioration state. Note that, in formula (1), N indicates the number of pieces of data, a indicates the standard deviation, j denotes the number of pieces of data, and for example, the random variable x is the input data (feature amount) or the like.

[Mathematical Formula 1]

$$\text{Gauss\_density}(x) = \frac{1}{N(\sqrt{2\pi}\sigma)^d} \sum_{j=0}^{N-1} \exp\left(-\frac{\|x - x_j\|^2}{2\sigma^2}\right) \tag{1}$$

Figure 9:
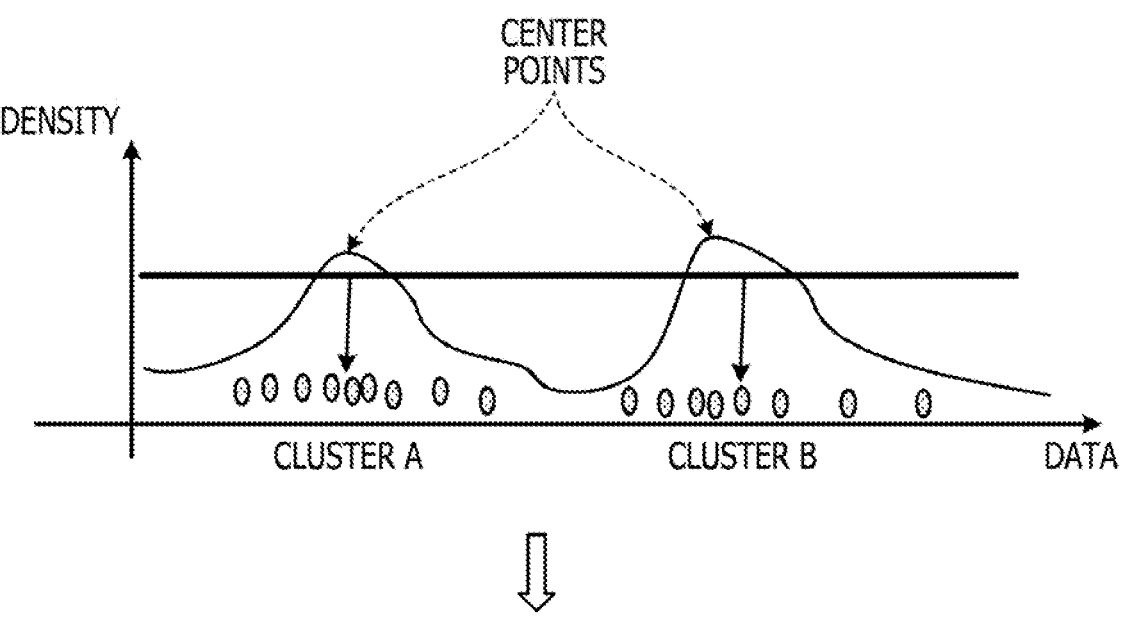
FIG. 9 is a diagram explaining the specification of the number of clusters and center points.

Subsequently, the preprocessing unit 22 records the number of clusters and a center point (representative point) of a region having a certain density or higher in each cluster. FIG. 9 is a diagram explaining the specification of the number of clusters and the center points. As illustrated in FIG. 9, the preprocessing unit 22 generates a graph in which the horizontal axis denotes the feature amount and the vertical axis denotes the density. Then, the preprocessing unit 22 specifies coordinates of a position (center point) having the highest density among pieces of data (training data) belonging to the cluster for each known cluster and stores the specified coordinates in the storage unit 12. In the example in FIG. 9, the number of clusters including a cluster A and a cluster B is stored as two, and two center points including the center point of the cluster A and the center point of the cluster B are stored.

Note that information indicating the feature of the data can be adopted as the coordinates of the center point, and for example, the feature amount that can be acquired from the machine learning model 13 and the above density information can be adopted. In addition, as the feature amount, for example, information that can be acquired from the final layer of the neural network, and information that can be acquired from the whole input data, such as an average pixel value of the input data, can be adopted. Furthermore, information on data classified in the feature space before deterioration can be used for the above processing by acquiring the information at the time of training and retaining the acquired information in the storage unit 12 or the like.

The deterioration estimation unit 23 includes a density calculation unit 24, a clustering unit 25, a label association unit 26, and a deterioration detection unit 27 and is a processing unit that detects the accuracy deterioration of the machine learning model 13. For example, the deterioration estimation unit 23 determines the accuracy deterioration of the machine learning model 13 periodically or at predetermined intervals such as after processing a certain number of pieces of the input data.

The density calculation unit 24 is a processing unit that calculates information corresponding to the density of each piece of the input data, using the determination result with respect to the input data under operation of the machine learning model 13. For example, once the operation is started, the density calculation unit 24 monitors the determination process by the model execution unit 21. Then, each time the input data is processed, the density calculation unit 24 acquires, from the model execution unit 21, the feature amount of the input data and the determination result in association with each other and holds the acquired feature amount and determination result in the storage unit 12 or the like.

Thereafter, for example, when the timing of deterioration determination is reached, the density calculation unit 24 uses the held feature amount of the input data and formula (1) to calculate the density of each piece of the input data by an approach similar to the approach of the preprocessing unit 22. Then, the density calculation unit 24, for example, stores the calculated density and the input data in association with each other in the storage unit 12 or outputs the calculated density to the clustering unit 25.

The clustering unit 25 is a processing unit that executes clustering to extract clusters and data belonging to the clusters based on the density of the input data, under the condition that the number of clusters and the number of center points specified by the preprocessing unit 22 coincide with each other.

Figure 10:
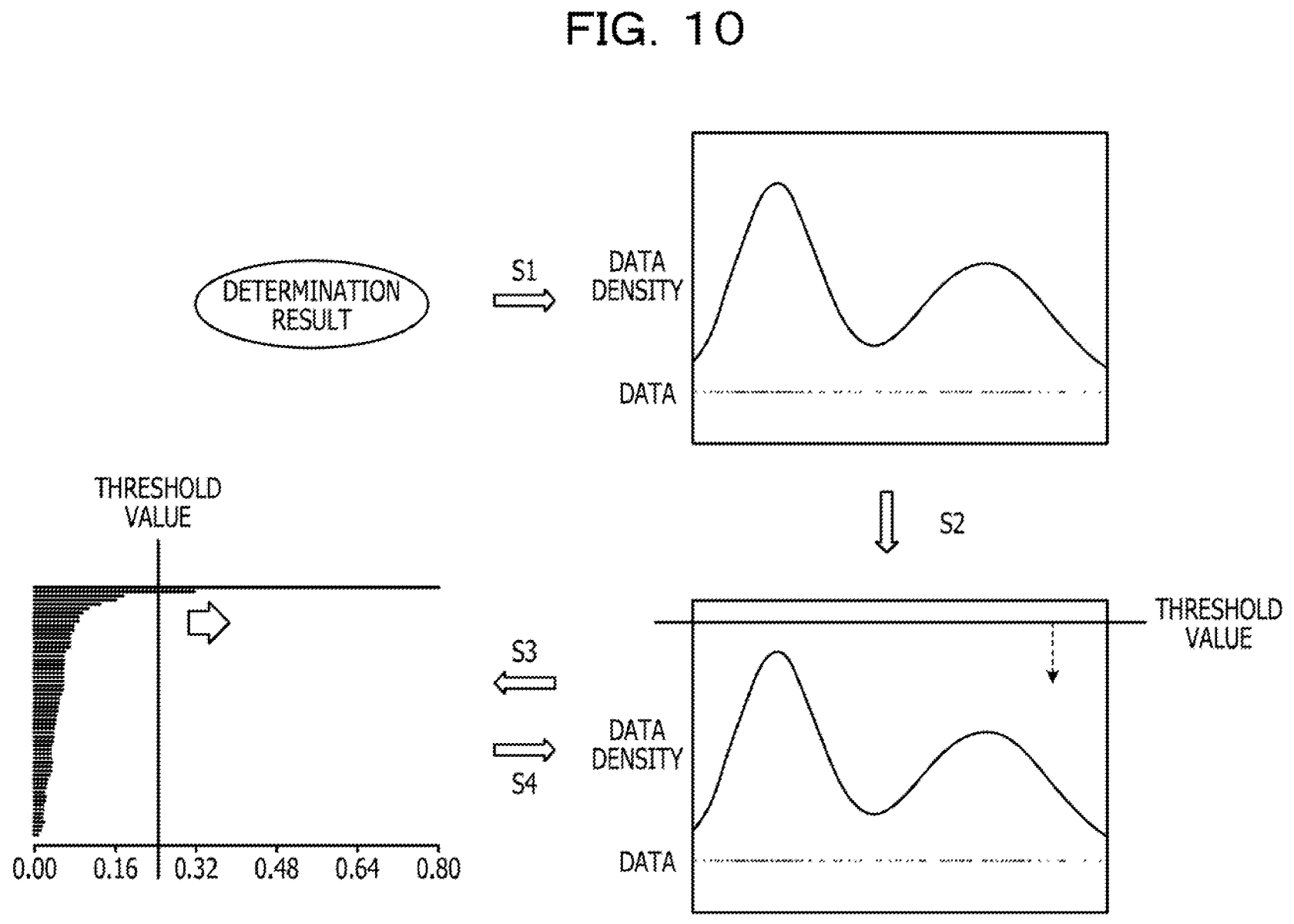

FIG. 10 is a diagram explaining clustering under operation. As illustrated in FIG. 10, the clustering unit 25 uses the feature amount and the density of the input data based on the determination result by the model execution unit 21 to generate a graph in which the horizontal axis denotes the feature amount and the vertical axis denotes the density (S1). Subsequently, the clustering unit 25 lowers a threshold value for the density in increments of a predetermined value and searches for a minimum threshold value that gives the same number as the number of clusters (here, two) specified by the preprocessing unit 22 (S2).

At this time, the clustering unit 25 executes persistent homology conversion (PH conversion) on the feature amount of the input data equal to or greater than the threshold value to refer to a zero-dimensional connected component and executes computation and specification of the number of clusters depending on whether or not the number of bars having a radius equal to or greater than a predefined threshold value coincides with the number of clusters specified in advance (S3). Here, when the number of bars exceeding the threshold value does not coincide with the number of clusters in advance, the clustering unit 25 lowers the threshold value by the predetermined value and repeats the process (S4).

In this manner, the clustering unit 25 repeats a process of lowering the threshold value for the density to extract input data having a density equal to or higher than the threshold value, and a process of computing the number of clusters by the PH conversion process on the extracted input data, until the number of clusters that coincide with the number of clusters in advance is detected. Then, when the numbers of clusters coincide with each other, the clustering unit 25 specifies center points C1 and C2 from the input data having a density equal to or higher than the threshold value (density) at that time. Thereafter, the clustering unit 25, for example, stores information obtained by clustering in the storage unit 12 or outputs the information to the label association unit 26.

Here, the persistent homology processing will be described. Here, "homology" means an approach of expressing the feature of the target by the number of m (m≥0)-dimensional holes. The "hole" mentioned here is the basis of a homology group, where a zero-dimensional hole represents a connected component, a one-dimensional hole represents a hole (tunnel), and a two-dimensional hole represents a cavity. The number of each-dimensional holes is called the Betti number. Then, "persistent homology" is an approach of featuring the transition of m-dimensional hole in a target (here, a set of points (point cloud)), and features relating to the arrangement of the points can be examined by the persistent homology. In this approach, each point in the target is gradually inflated into a sphere shape, and in the course of the inflation, the time point when each hole is produced (represented by the radius of the sphere when produced) and the time point when each hole disappears (represented by the radius of the sphere when disappearing) are specified.

Figure 11A:
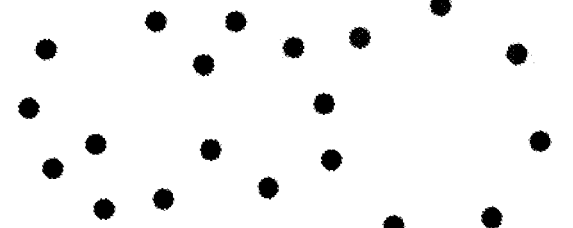
FIG. 11A, FIG. 11B, FIG. 11C, and FIG. 11D are diagrams explaining persistent homology.
Figure 11B:
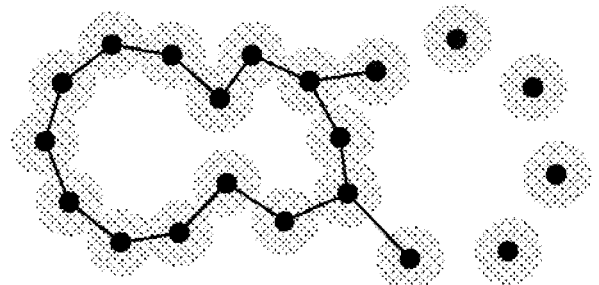
Figure 11C:
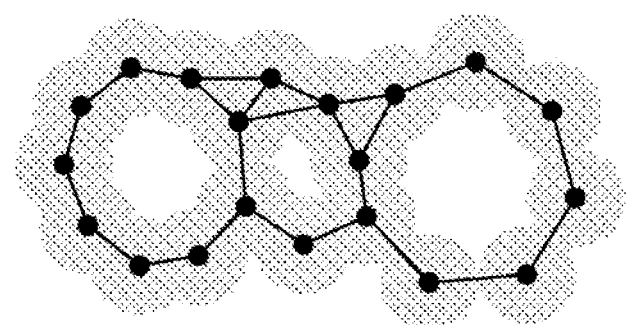
Figure 11D:
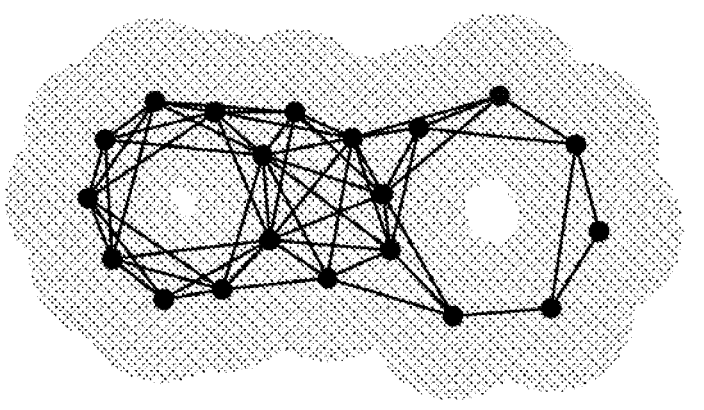

The persistent homology will be described more specifically with reference to FIG. 11A, FIG. 11B, FIG. 11C, and FIG. 11D. FIG. 11A, FIG. 11B, FIG. 11C, and FIG. 11D are diagrams explaining the persistent homology. As a rule, when making contact with one sphere, the centers of two spheres are joined by a line segment, and when three spheres make contact with each other, the centers of the three spheres are joined by line segments. Here, only the connected components and the holes are considered. In the case of FIG. 11A (radius r=0), only the connected components are produced, and no hole is produced. In the case of FIG. 11B (radius r=$r_1$), holes are produced, and a part of the connected components have disappeared. In the case of FIG. 11C (radius r=$r_2$), more holes are produced, and only one connected component is kept. In the case of FIG. 11D (radius r=$r_3$), the number of connected components is still one, and one hole has disappeared.

In the course of computing the persistent homology, the radius at production and the radius at disappearance of the basis (which is the hole) of the homology group are computed. By using the radius at production and the radius at disappearance of the hole, barcode data can be generated. Since the barcode data is generated for each hole dimension, one mass of barcode data can be generated by integrating the barcode data of a plurality of hole dimensions. Continuous data is data indicating the relationship between the radius (which is time) of the sphere and the Betti number in the persistent homology.

Figure 12:
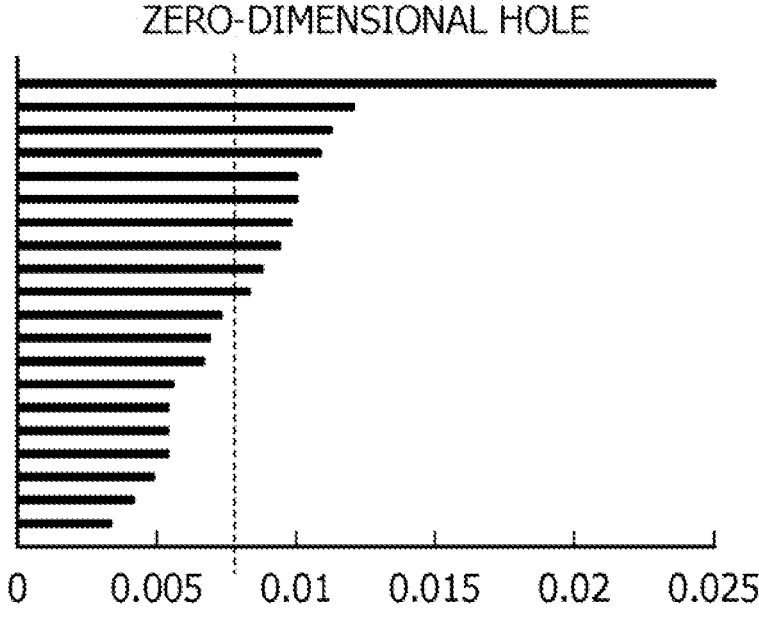
FIG. 12 is a diagram explaining barcode data.

Note that, here, general generation of the barcode data will be briefly described. FIG. 12 is a diagram explaining the barcode data. The graph in FIG. 12 is a graph generated from the barcode data based on the zero-dimensional holes (connected components) in FIG. 11A, FIG. 11B, FIG. 11C, and FIG. 11D, and the horizontal axis represents the radius.

This means that the clustering unit 25 can specify the number of clusters of the input data by measuring the number of bars longer than a threshold value, on the basis of the zero-dimensional barcode data. For example, it is assumed that the clustering unit 25 determines that the number of clusters is the same as the number of pieces of the training data when there are two bars equal to or longer than the threshold value. At this time, the clustering unit 25 can specify coordinates of each of the above center points C1 and C2 by specifying data having the highest density among pieces of the input data belonging to the bar for each bar.

Returning to FIG. 5, the label association unit 26 is a processing unit that associates a new label with the input data based on the clustering result by the clustering unit 25. Specifically, the label association unit 26 labels input data with a density equal to or higher than the threshold value designated by the clustering unit 25, based on the clusters to which each piece of the input data belongs, and then labels input data having a density lower than the threshold value, based on the probability of belonging to each cluster.

First, the label association unit 26 specifies clusters to which each center point (C1 and C2) specified by the clustering unit 25 belongs and associates a label with the input data equal to or higher than the threshold value, which has been extracted by the clustering unit 25.

Figure 13:
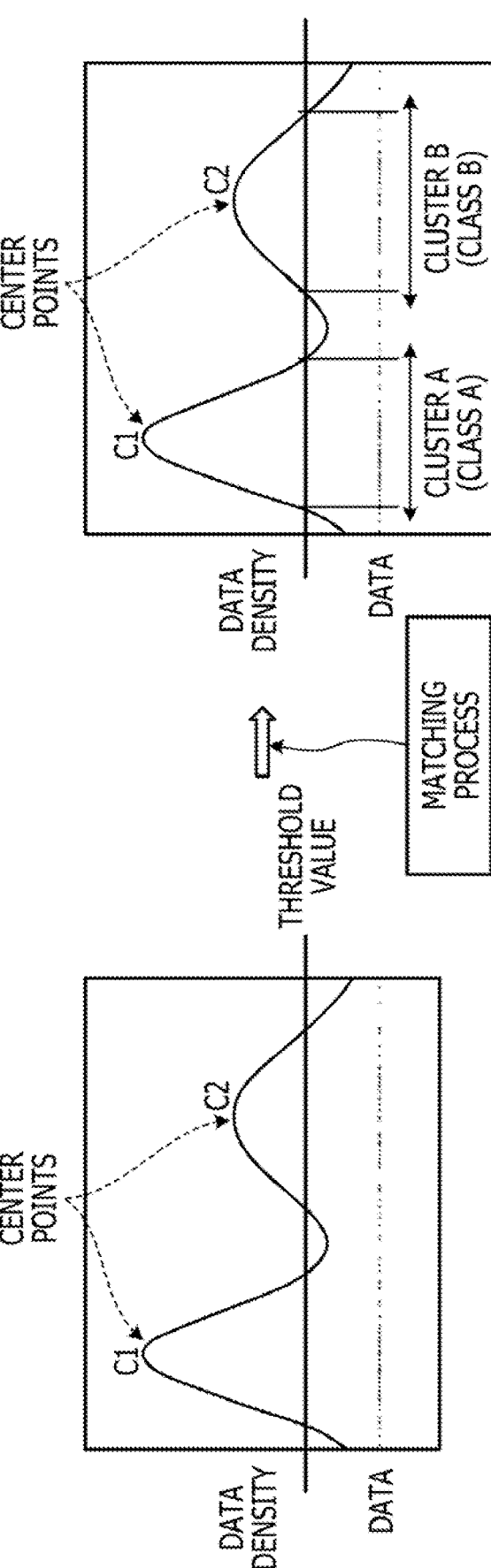
FIG. 13 is a diagram explaining cluster allocation.

FIG. 13 is a diagram explaining cluster allocation. As illustrated in FIG. 13, the label association unit 26 acquires input data that is equal to or higher than the threshold value and is the minimum in a state where the number of clusters is two by the PH process, and two center points (C1 and C2) from the clustering unit 25. Subsequently, for the two center points (C1 and C2), the label association unit 26 designates clusters to which each of the two center points belongs, based on a matching process with the histories of the center points calculated at the deterioration determination timing up to that point in time.

Figure 14:
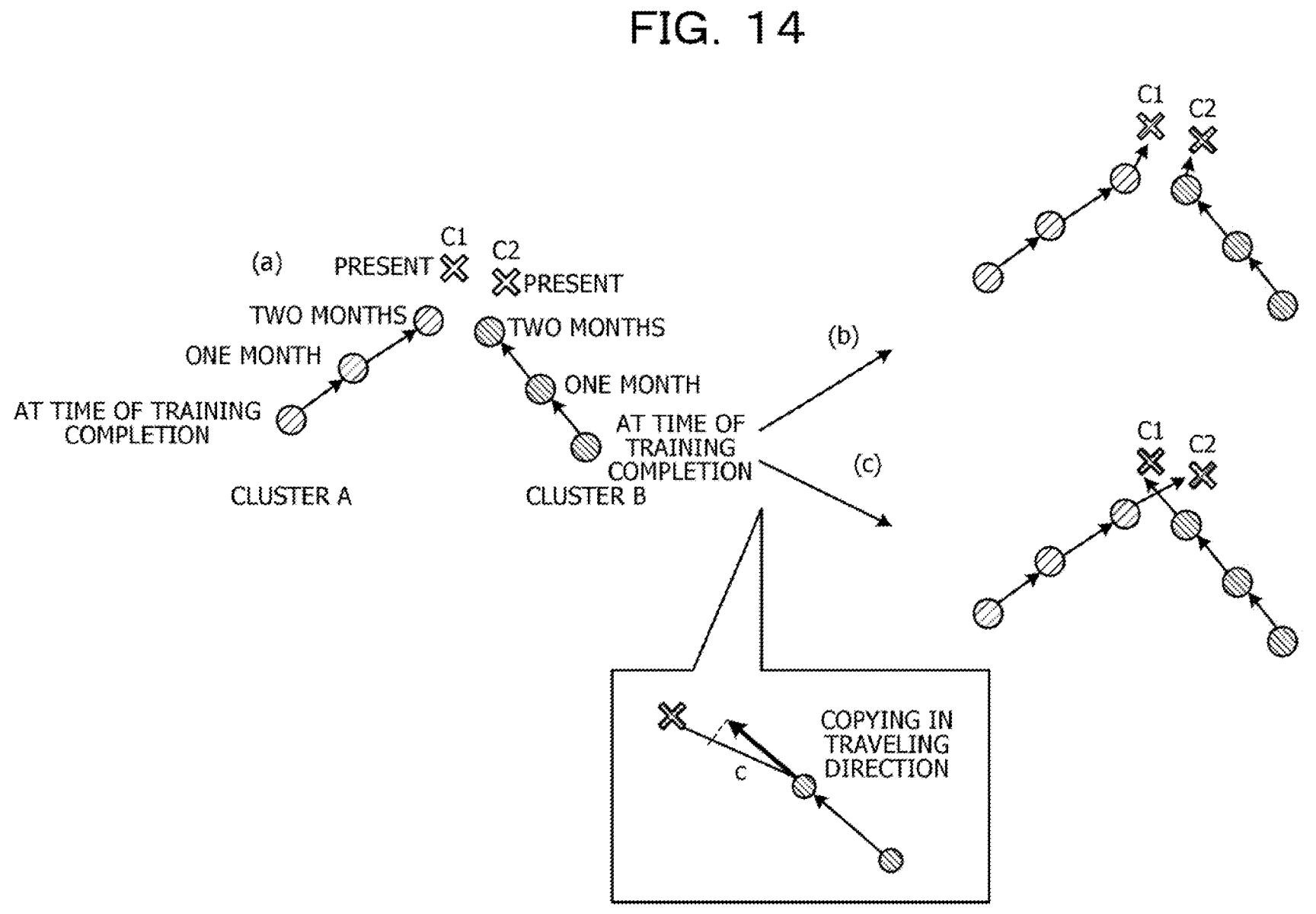

FIG. 14 is a diagram explaining the matching process. As illustrated in FIG. 14, the label association unit 26 maps the center points of each cluster specified until the present from the time of training completion, in the feature space and estimates a traveling direction to designate the clusters for each of the two center points (C1 and C2) currently extracted. Here, simply matching the closest center points is sometimes not suitable when fluctuations of the center points are taken into account. When the center points have fluctuated as illustrated in (a) of FIG. 14 and two new points are newly matched, matching at closer points will result in (b) of FIG. 14, but this is an unnatural movement from the viewpoint of the directions of the fluctuations. It is more natural to fluctuate as illustrated in (c) of FIG. 14.

Thus, the label association unit 26 introduces a correction distance. For example, a mechanism of choosing a closer point when progressing in the traveling direction is introduced, and the traveling direction is specified by computing the inner product of a vector in the traveling direction from the previous point and a vector joining the fulcrum and the target point. To take an example, the label association unit 26 selects the nearest neighboring point using, as the correction distance, a value obtained by multiplying the distance between two points by (tanh(c)+1)/2 as a weight where the value of the inner product is denoted by c.

In the example in FIG. 13, it is assumed that the label association unit 26 associates the center point C1 with the cluster A (label=class A) and the center point C2 with the cluster B (label=class B). As a result, the label association unit 26 sets the class A as a label in each piece of input data having a density equal to or higher than the threshold value and belonging to the same cluster as the center point C1. Similarly, the label association unit 26 sets the class B as a label in each piece of input data having a density equal to or higher than the threshold value and belonging to the same cluster as the center point C2. Note that the cluster to which each piece of the input data belongs can also be specified by a graph as illustrated in FIG. 13 and can also be specified as the same cluster as a center point having the shortest distance among distances from each center point.

Figure 15:
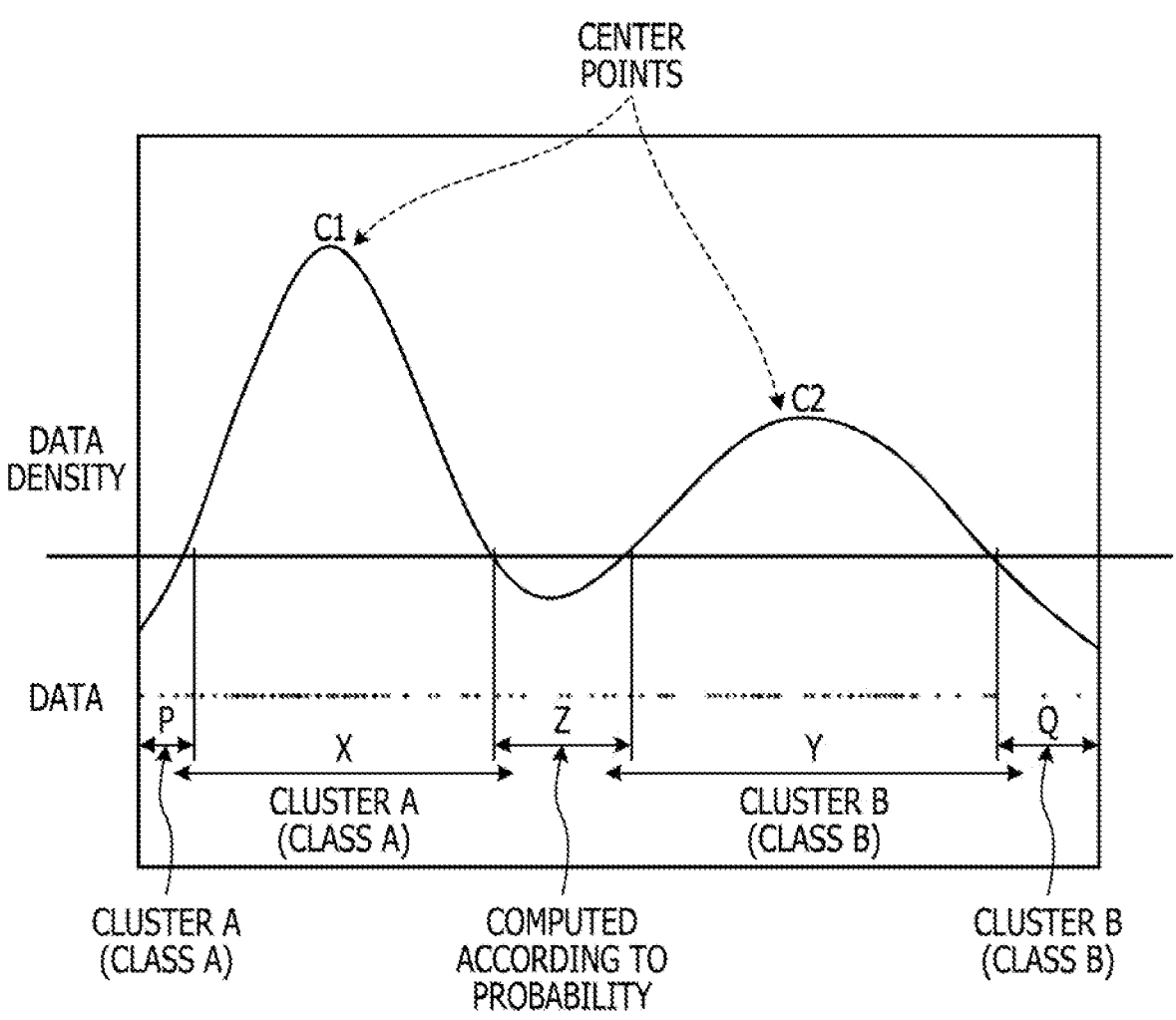
FIG. 15 is a diagram explaining the continuation of clustering under operation.

Next, a label is associated with each piece of input data lower than the threshold value, which has not been extracted by the clustering unit 25. FIG. 15 is a diagram explaining the continuation of clustering under operation. The label association unit 26 separately measures the distance to the center C1 and the distance to C2 of each cluster for each piece of the unextracted input data and designates that the data belongs to the closest cluster when the second closest distance is longer than the maximum value among the distances to the centers of each cluster.

In the case of the example in FIG. 15, among regions other than a region X (cluster A) and a region Y (cluster B) for which the clusters have been designated by the above approach, the label association unit 26 designates input data of a region P outside the region X as the cluster A and designates input data of a region Q outside the region Y as the cluster B.

Then, for input data of a region Z whose second closest distance is shorter than the maximum value among the distances to the centers of each cluster (located in the middle of a plurality of clusters), the label association unit 26 determines that data of a plurality of nearby clusters are mixed and measures and gives the probability of each cluster with regard to each piece of the input data. Specifically, the label association unit 26 calculates the probability of belonging to each cluster for each piece of the input data belonging to the region Z, using the k-nearest neighbor method, the uniform random method, the distribution ratio holding method, or the like, and generates and gives probabilistic labels (the probability of the class A, the probability of the class B, and the probability of the class C).

For example, for each piece of the input data belonging to the region Z, the label association unit 26 extracts k pieces of already labeled input data located in the neighbor of the input data belonging to the region Z and, when the ratios of the extracted input data are the class A=0.6, the class B=0.4, and the class C=0, gives these ratios as labels.

In addition, the label association unit 26 equally gives the same probability to each cluster with respect to each piece of the input data belonging to the region Z. For example, the label association unit 26 gives the class A=0.5 and the class B=0.5 as labels in the case of two-class classification and gives, for example, the class A=0.3, the class B=0.3, the class C=0.3 as a labels in the case of three-class classification.

In addition, for each piece of the input data belonging to the region Z, from the consideration that the ratio of the number of pieces of data of each cluster is unchanged between the time of operation and the time of training, the label association unit 26 computes the ratio of data whose label is undefined and gives the computed ratio as a label. For example, when the ratio of the class A and the class B of the training data is 5:5 and the ratio of the number of pieces of data of the class A and the number of pieces of data of a class Y is 6:4, for which the labels have been set, the label association unit 26 sets labels in each piece of the input data of the region Z such that the ratio of the entire retraining data becomes 5:5.

Figure 16:
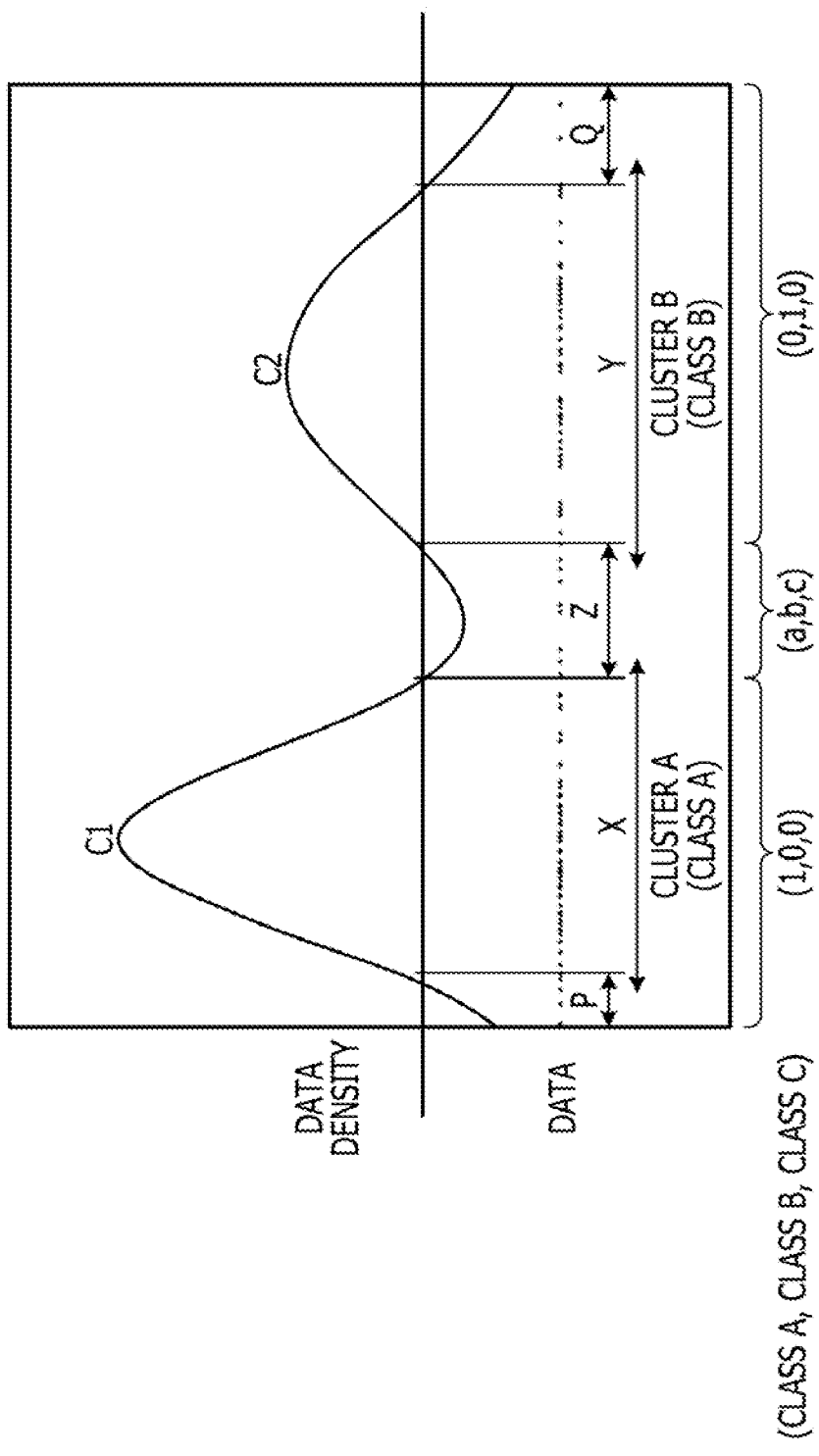
FIG. 16 is a diagram explaining labeling of input data.

FIG. 16 depicts information on labels given to each piece of the input data by estimation by the approach described above. FIG. 16 is a diagram explaining labeling of the input data. The estimated labels are given according to the probability of belonging to each cluster (the probability of belonging to the class A, the probability of belonging to the class B, and the probability of belonging to the class C). As illustrated in FIG. 16, each piece of the input data of the region X and the region P is given an estimated label [1, 0, 0], each piece of the input data of the region Y and the region Q is given an estimated label [0, 1, 0], and each piece of the input data of the region Z is given an estimated label [a, b, c]. Note that a, b, and c denote the probability calculated by an approach such as the k-nearest neighbor method. Then, the label association unit 26, for example, stores the association between each piece of the input data and the estimated label in the storage unit 12 or outputs the association to the deterioration detection unit 27.

Returning to FIG. 5, the deterioration detection unit 27 is a processing unit that detects the accuracy deterioration of the machine learning model 13. Specifically, the deterioration detection unit 27 detects the accuracy deterioration of the machine learning model 13 by comparing the determination result of the machine learning model 13 by the model execution unit 21 and the estimation result (estimated label) generated by the label association unit 26.

Figure 17:
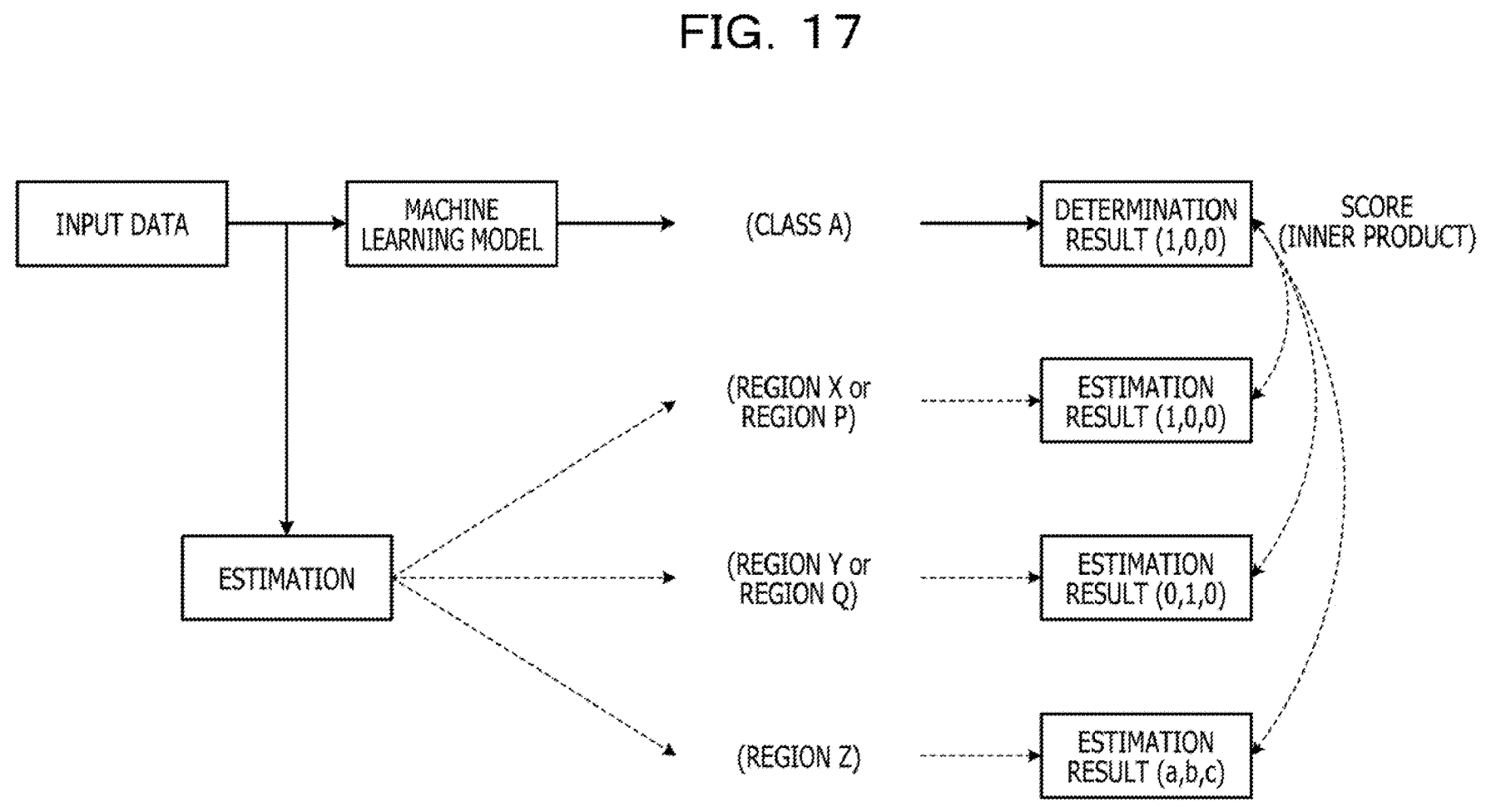

FIG. 17 is a diagram explaining deterioration determination for model accuracy. As illustrated in FIG. 17, the deterioration detection unit 27 generates a determination result [1, 0, 0] based on the output result (class A) obtained by inputting the input data to the machine learning model 13. Meanwhile, by the above estimation process, the deterioration detection unit 27 acquires the estimation result [1, 0, 0] when belonging to the region X or the region P, the estimation result [0, 1, 0] when belonging to the region Y or the region Q, or the estimation result [a, b, c] when belonging to the region Z, with respect to the input data.

In this manner, the deterioration detection unit 27 acquires the determination result and the estimation result for each piece of the input data and executes the deterioration determination by comparing the acquired determination result and estimation result. For example, with respect to probability vectors of each piece of the input data (each point) indicated by each estimation result, the deterioration detection unit 27 assumes the sum (inner product) of component products in the vector representation of the determination result by the machine learning model 13, as the score of that point, and executes the deterioration determination by comparing a value obtained by dividing the total of the scores by the number of pieces of data, with a threshold value.

FIG. 18 is a diagram explaining details of the determination of the model accuracy. As illustrated in FIG. 18, the determination result and the estimation result of the machine learning model are acquired with respect to each piece of the input data. For example, input data 1 has a determination result of [1, 0, 0] because it is determined to fall under the class A by the machine learning model 13 and has an estimation result of [1, 0, 0] because it is estimated to belong to the cluster A by the label association unit 26. Similarly, input data 2 has a determination result of [0, 1, 0] because it is determined to fall under the class B by the machine learning model 13 and has an estimation result of [0.5, 0.5, 0] based on the probability calculated as it is estimated to belong to the region Z by the label association unit 26.

Then, the deterioration detection unit 27 generates a matrix of the determination results of each piece of the input data by the machine learning model 13 and a matrix of the estimation results of each piece of the input data, calculates the sum of the element products, and calculates the estimation accuracy (score) by dividing the sum of the element products by the number of pieces of data. Additionally, the deterioration detection unit 27 detects that the accuracy of the machine learning model 13 is in a deteriorated state, when the estimation accuracy is lower than a threshold value.

Returning to FIG. 5, the retraining unit 28 is a processing unit that executes retraining of the machine learning model 13 when accuracy deterioration is detected by the deterioration detection unit 27. For example, the retraining unit 28 generates retraining data of which the correct answer information is the estimation result estimated by the deterioration detection unit 27. Then, the retraining unit 28 conducts retraining of the machine learning model 13 using the retraining data and stores the machine learning model 13 after retraining in the storage unit 12.

Figure 19:
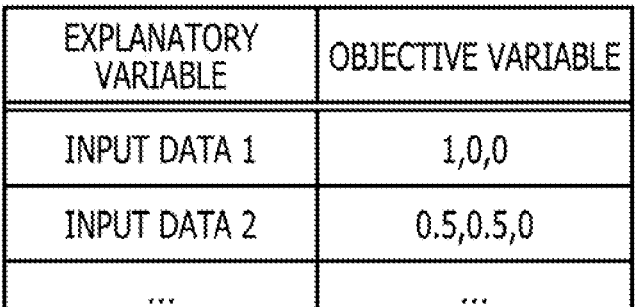
FIG. 19 is a diagram explaining retraining.

FIG. 19 is a diagram for explaining retraining. As illustrated in FIG. 19, the retraining unit 28 acquires the estimation result with respect to each piece of the input data and generates retraining data of which the explanatory variable is the input data and the objective variable is the estimation result. For example, the retraining unit 28 generates [input data 1, (1, 0, 0)], [input data 2, (0.5, 0.5, 0)], and the like as [explanatory variable, objective variable]. Then, the retraining unit 28 inputs the retraining data to the machine learning model 13 and executes retraining of the machine learning model 13 using an error back propagation method or the like, based on the difference between the output result of the machine learning model 13 and the objective variable. Note that the error back propagation method or the like can be adopted as a retraining approach. In addition, the timing to end the retraining can be optionally set, such as when the training with all the retraining data is completed or when restoration error becomes less than the threshold value.

[Flow of Processing]

Figure 20:
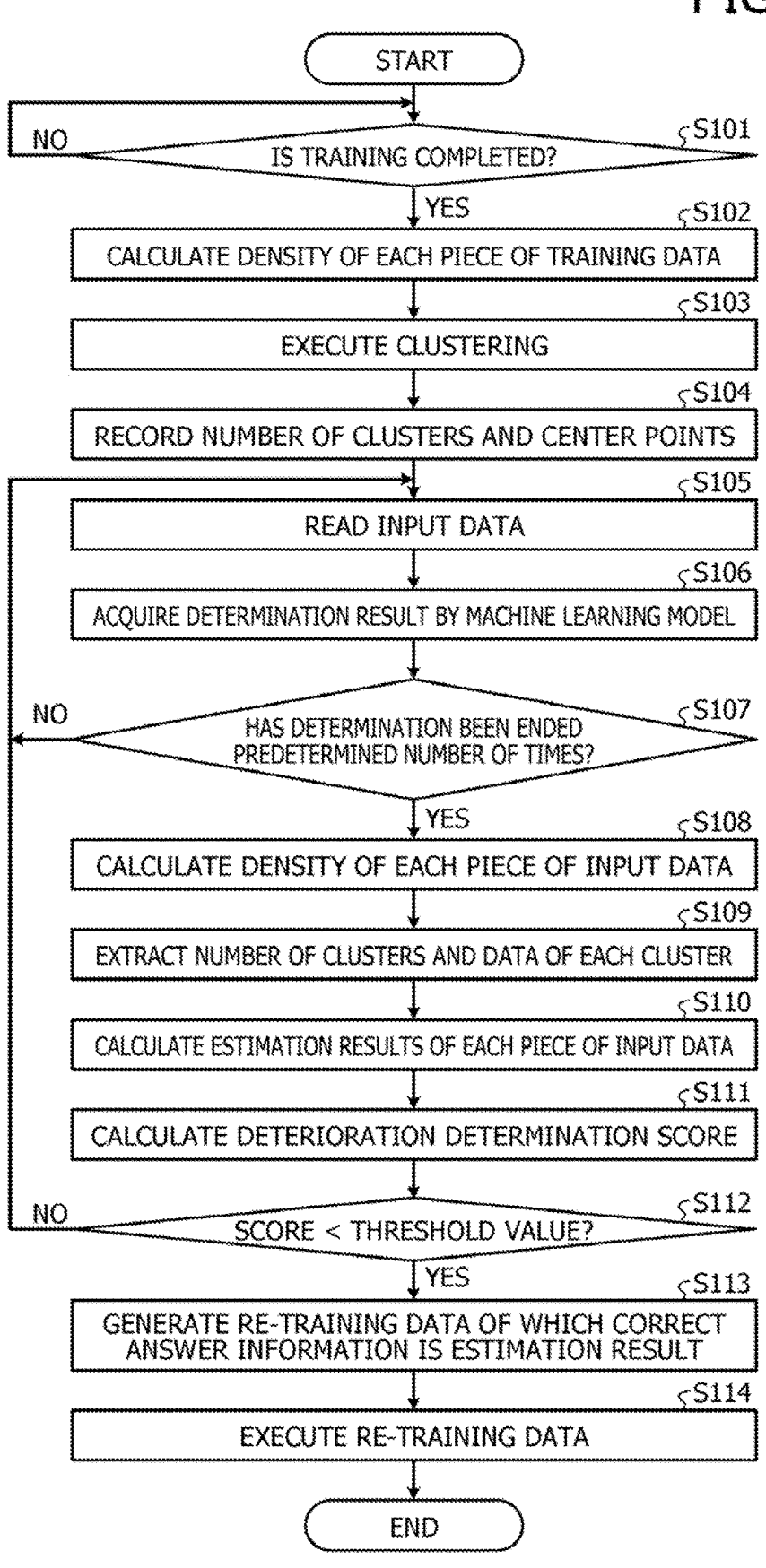
FIG. 20 is a flowchart illustrating a flow of processing.

FIG. 20 is a flowchart illustrating a flow of processing. As illustrated in FIG. 20, when the training of the machine learning model 13 is completed (S101: Yes), the preprocessing unit 22 calculates the density of each piece of training data (S102).

Subsequently, the preprocessing unit 22 executes clustering (S103) and records the number of clusters and the center points of each cluster (S104). Note that, at this timing, since the training is completed and a precise state of classification into known classes has been enabled, clustering can be omitted because the number of clusters is also known.

Thereafter, the model execution unit 21 reads the input data from the input data DB 14 (S105) and inputs the input data to the machine learning model 13 to acquire the determination result (S106). Here, when the determination has not been ended a predetermined number of times (S107: No), it is determined that the deterioration determination timing has not been reached, and S105 and subsequent steps are repeated.

On the other hand, when the determination has been ended a predetermined number of times (S107: Yes), the deterioration estimation unit 23 determines that it is the deterioration determination timing and calculates the density with respect to each piece of the input data input to the machine learning model 13 (S108). Subsequently, the deterioration estimation unit 23 executes clustering to compute the number of clusters and extract data belonging to each cluster (S109).

Then, the deterioration estimation unit 23 calculates the estimation results of each piece of the input data (S110) and calculates the deterioration determination score using the determination result by the machine learning model 13 and the estimation results by the deterioration estimation unit 23 (S111).

Here, when the score is equal to or higher than the threshold value (S112: No), the deterioration estimation unit 23 determines that the accuracy deterioration has not progressed and repeats S105 and subsequent steps.

On the other hand, when the score is lower than the threshold value (S112: Yes), the retraining unit 28 determines that the accuracy deterioration has progressed, generates the retraining data of which the correct answer information is the estimation result (S113), and executes retraining of the machine learning model 13 using the retraining data (S114). Thereafter, S101 and subsequent steps are executed on the retrained machine learning model 13.

Effects

As described above, the performance estimation device 10 is capable of automatically detecting the accuracy deterioration of the machine learning model 13 and also capable of automatically generating new training data using the input data set used for the determination. Therefore, the performance estimation device 10 may execute retraining of the machine learning model 13 at the timing when the accuracy deterioration of the machine learning model 13 occurs and may suppress the accuracy deterioration of the machine learning model. In addition, since the performance estimation device 10 is capable of automatically generating data for retraining, the processing load involved in retraining may be mitigated and the time involved in retraining may be shortened. For example, the performance estimation device 10 may implement real-time accuracy monitoring, automatic accuracy restoration, and labor saving in retraining.

Figure 21:
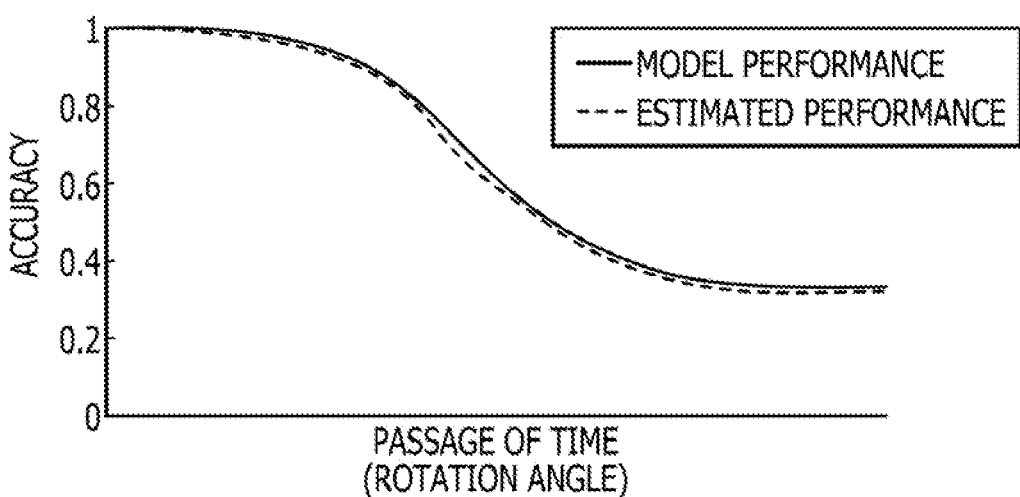
FIG. 21 is a diagram explaining an effect of the first embodiment.

FIG. 21 is a diagram explaining an effect of the first embodiment. FIG. 21 depicts a change in performance (model performance) of the machine learning model 13, and a change in estimated performance by the performance estimation device 10 when Mixed National Institute of Standards and Technology database (MNIST) was used as the input data set. Note that the vertical axis denotes the accuracy, and the horizontal axis denotes the passage of time, which is the rotation angle because the input data rotates with changes in time. As illustrated in FIG. 21, the change in the estimated performance by the performance estimation device 10 indicates a change similar to the change in the model performance. Therefore, it can be seen that the accuracy of the machine learning model 13 may be monitored in real time by the performance estimation device 10 described in the first embodiment.

Second Embodiment

Incidentally, the first embodiment has described an example in which the estimation result is generated at the timing when a certain number of determination processes have been executed to determine the accuracy deterioration, and when the accuracy deterioration is detected, the retraining data based on the estimation result is generated to execute retraining of the machine learning model 13, but the timing of performing retraining is not limited to this example. For example, by sequentially modifying the machine learning model 13 using the estimation result, the applicable range of the machine learning model 13 may be expanded, and the occurrence of accuracy deterioration may be suppressed.

Figure 22:
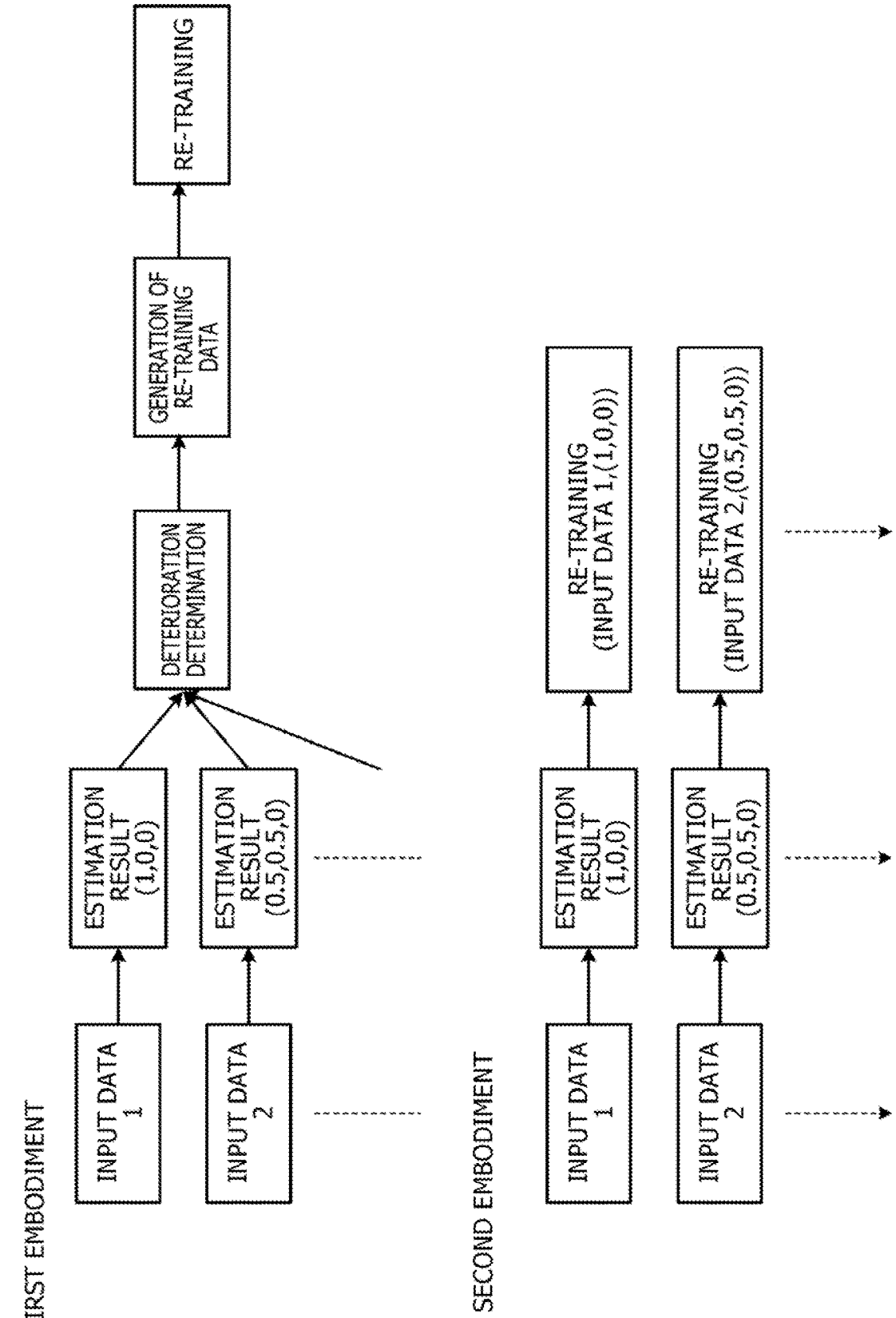
FIG. 22 is a diagram explaining retraining of a second embodiment.

FIG. 22 is a diagram explaining retraining of a second embodiment. As illustrated in FIG. 22, the performance estimation device 10 according to the first embodiment generates the estimation results from each piece of the input data used for the determination and executes deterioration determination using the estimation results when a certain number of determination results are accumulated. Thereafter, when the accuracy deterioration is detected, the performance estimation device 10 according to the first embodiment generates the retraining data of which the correct answer information is the estimation result and executes sequential modification of the machine learning model 13.

In contrast to this, when a certain number of determination results are accumulated, a performance estimation device 10 according to the second embodiment executes calculation of the data density, specification of the center point, clustering, matching of the center points, and the like, as in the first embodiment, to generate the estimation result of the input data in the order of processing. Thereafter, unlike the first embodiment, the performance estimation device 10 does not execute the detection of accuracy deterioration after accumulating the estimation results, but each time the estimation result is generated, conducts training of a machine learning model 13 with the retraining data of which the correct answer information is the estimation result. For example, sequential modification of the machine learning model 13 is executed without waiting for the accuracy to deteriorate.

Figure 23:
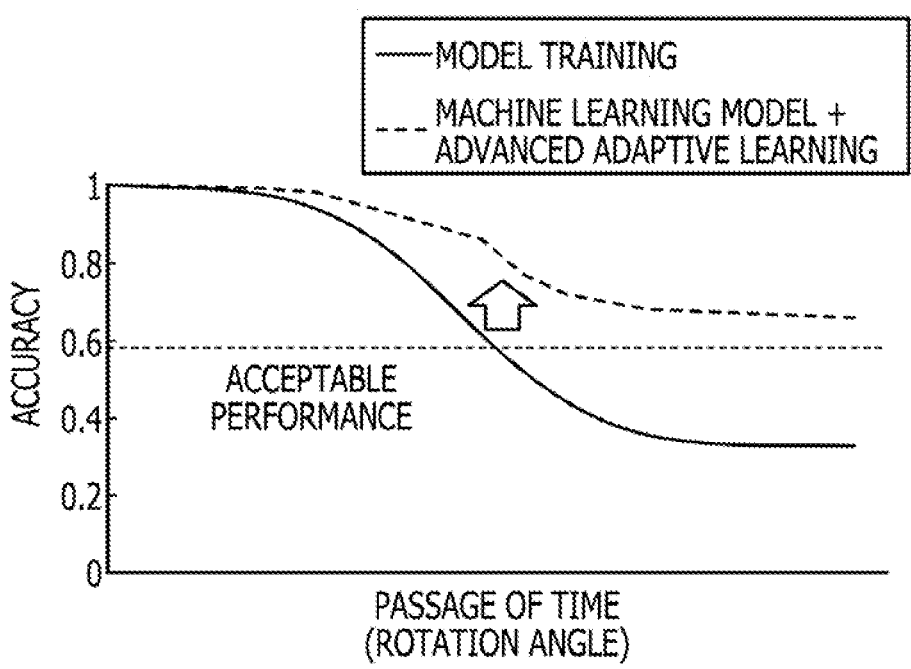
FIG. 23 is a diagram explaining an effect of the second embodiment.

In the above manner, the applicable range of the machine learning model 13 may be expanded to before the occurrence of accuracy deterioration, and the occurrence of accuracy deterioration may be suppressed. FIG. 23 is a diagram explaining an effect of the second embodiment. FIG. 23 depicts a change in performance (model performance) of the machine learning model 13, and a change in performance of the machine learning model 13 when advanced adaptive training, which is the sequential modification according to the second embodiment, was performed, when MNIST was used as the input data set. Note that the vertical axis denotes the accuracy, and the horizontal axis denotes the passage of time (rotation angle).

As illustrated in FIG. 23, the accuracy of the machine learning model 13 deteriorates with the passage of time when the advanced adaptive training is not performed. On the other hand, when the advanced adaptive training is performed, the rate of deterioration with the passage of time may be suppressed. Therefore, as compared with the approach according to the first embodiment, an interval during which the determination accuracy is equal to or higher than the acceptable range (acceptable performance) may be maintained for a long term.

Third Embodiment

While the embodiments of the present invention have been described thus far, the present invention may be carried out in various kinds of different modes in addition to the embodiments described above.
[Retraining Data]

In the first embodiment, an example in which the estimation result is set as the correct answer information in each piece of the input data has been described, but the present invention is not limited to this example. Specifically, by manually labeling data whose probability of estimation result is equal to or lower than a certain level, the man-hours for labeling may be lessened as compared with the case of labeling all.

For example, in the example in FIG. 18, among the probabilities of the class A, the class B, and the class C, which are the estimation results, for input data having probabilities equal to or lower than a threshold value (for example, 0.3), and input data with a difference between the maximum probability and the minimum probability equal to or lower than a threshold value, labeling is manually performed without using the estimation results. In the above manner, data with lower reliability may be removed from the retraining data, and the retraining accuracy may be improved.

In addition, the retraining data may be selected depending on the estimation accuracy (score) calculated in the first embodiment. For example, a performance estimation device 10 generates the retraining data using all estimation results when the estimation accuracy (score) is less than a first threshold value but equal to or higher than a second threshold value for detecting accuracy deterioration. Furthermore, when the estimation accuracy (score) is less than the second threshold value, the performance estimation device 10 randomly selects half from the estimation results to generate the retraining data and also generates the retraining data in which labeling is manually performed.
[Learning and Retraining]

For example, when the amount of data at the time of training is small, sufficient accuracy is sometimes not obtained even if the training is conducted. When the operation is started in this state, training of a machine learning model 13 can be conducted by labeling acquired input data by the above approach and using both of training data prepared at the beginning and newly generated training data. As a result, the machine learning model 13, which initially has low performance at the start of operation, may be automatically improved to a high-performance machine learning model.
[Computation of Number of Clusters]

Figure 24:
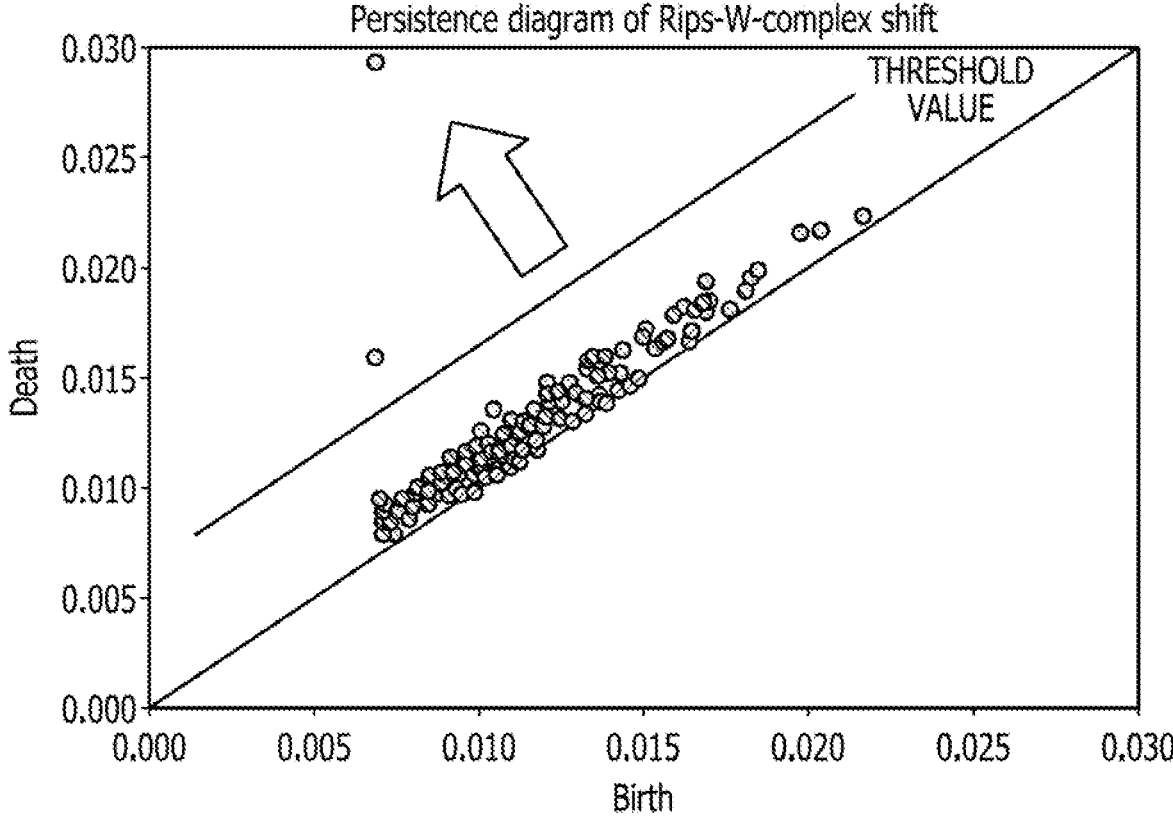
FIG. 24 is a diagram explaining the computation of the number of clusters using a distance to measure (DTM).

In the above embodiments, an example of computing the number of clusters using the PH conversion has been described, but the computation of the number of clusters is not limited to this example. For example, a persistent diagram such as "DTM-based filtration" can be used. FIG. 24 is a diagram explaining the computation of the number of clusters using DTM. FIG. 24 is a diagram in which the horizontal axis denotes the occurrence time point (Birth) and the vertical axis denotes the disappearance time point (Death). As illustrated in FIG. 24, the number of clusters can be computed from the number of points whose distance from a predefined threshold value (diagonal line) is equal to or greater than the threshold value.
[Use of Feature Amount]

In the above embodiments, an example of using the feature amount of the input data has been described, but the feature amount is not limited to this example. Any information indicating the feature amount of the input data is only needed, and a variety of feature amounts used in the machine learning or the like can also be adopted. In addition, the feature space is an example of a space whose coordinates are the feature amounts obtained from the input data, and the two-dimensional space is exemplified in the first embodiment. However, the space is not limited to this example, and various feature spaces used in the machine learning and the deep learning can be used. For example, a feature space representing a model applicability domain can be used.
[Computation of Density]

In the first embodiment, an example of using the Gauss density has been described, but the embodiment is not limited to this example, and a variety of known approaches such as eccentricity and K-nearest neighbor (KNN) distance (KNN algorithm) can be used. Note that, in the Gauss density and the like, the larger the value, the higher the density. However, in the KNN distance, the smaller the value (distance), the higher the density. Accordingly, a point with the lowest density is selected in specifying the representative point.

[Numerical Values, Etc.]

In addition, the numerical values, each threshold value, the feature space, the number of clusters, the number of labels, and the like used in the above embodiments are merely examples and can be optionally altered. Furthermore, the input data, the training method, and the like are also merely examples and can be optionally altered. Besides, a variety of approaches such as neural networks can be adopted for the machine learning model.

[System]

Pieces of information including a processing procedure, a control procedure, a specific name, various types of data, and parameters described above or illustrated in the drawings can be optionally altered unless otherwise noted.

In addition, each constituent element of each device illustrated in the drawings is functionally conceptual and does not necessarily have to be physically configured as illustrated in the drawings. For example, specific forms of distribution and integration of each device are not limited to those illustrated in the drawings. For example, the whole or a part of the devices may be configured by being functionally or physically distributed or integrated in optional units according to various loads, usage situations, or the like.

Moreover, all or any part of individual processing functions performed in each device can be implemented by a central processing unit (CPU) and a program analyzed and executed by the corresponding CPU or may be implemented as hardware by wired logic.

[Hardware]

Figure 25:
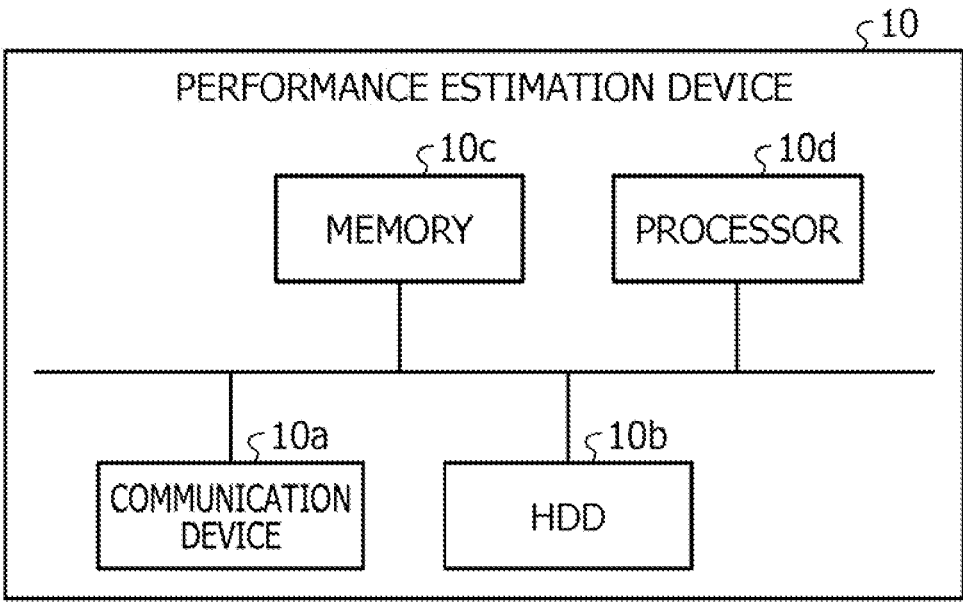
FIG. 25 is a diagram explaining a hardware configuration example.

FIG. 25 is a diagram for explaining a hardware configuration example. As illustrated in FIG. 25, the performance estimation device 10 includes a communication device 10a, a hard disk drive (HDD) 10b, a memory 10c, and a processor 10d. In addition, the respective units illustrated in FIG. 25 are interconnected by a bus or the like.

The communication device 10a is a network interface card or the like and communicates with another device. The HDD 10b stores programs and DBs for operating the functions illustrated in FIG. 5.

The processor 10d reads a program that executes processing similar to the processing of each processing unit illustrated in FIG. 5 from the HDD 10b or the like and loads the read program into the memory 10c, thereby operating a process that executes each function described with reference to FIG. 5 or the like. For example, this process executes functions similar to the functions of each processing unit included in the performance estimation device 10. Specifically, the processor 10d reads, from the HDD 10b or the like, a program having functions similar to the functions of the model execution unit 21, the preprocessing unit 22, the deterioration estimation unit 23, the retraining unit 28, and the like. Then, the processor 10d executes a process for executing processing similar to the processing of the model execution unit 21, the preprocessing unit 22, the deterioration estimation unit 23, the retraining unit 28, and the like.

As described above, the performance estimation device 10 operates as an information processing device that executes a performance estimation method by reading and executing the program. In addition, the performance estimation device 10 can also implement functions similar to the functions of the above-described embodiments by reading the program described above from a recording medium by a medium reading device and executing the read program described above. Note that other programs mentioned in the embodiments are not limited to being executed by the performance estimation device 10. For example, the present invention can be similarly applied to a case where another computer or server executes the programs, or a case where these computer and server cooperatively execute the programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an estimation program of retraining a machine learning model using, as supervised learning data, data with labels each of which is targeted for estimation and assigned by a clustering technique, the estimation program comprising instructions which, when executed by at least one computer, cause the at least one computer to execute a process, the process comprising:

specifying, for each training cluster of a plurality of training clusters, a representative point from among a plurality of points included in the each training cluster to obtain a plurality of representative points for the plurality of training clusters, each of the plurality of training clusters identifiably corresponding to one of the labels targeted for estimation, the plurality of training clusters being generated by clustering, in a feature space, a training data set used in a training phase for training of the machine learning model that estimates the labels according to input data in the training data set, wherein a number of the plurality of training clusters is equal to a number of the labels targeted for estimation;

setting boundaries between each of a plurality of input clusters under a condition that a number of the plurality of input clusters and the number of the representative points coincide with each other, the plurality of input clusters being generated by clustering, in the feature space, an input data set used in an operation phase of the trained machine learning model;

acquiring estimation results for the labels with respect to the input data set based on a correspondence relationship between the plurality of input clusters and the plurality of training clusters after the setting of the boundaries; and re-training the machine learning model using, as the supervised learning data, a combination of the input data set and labels derived from the estimation results.

2. The non-transitory computer-readable storage medium according to claim 1, wherein the specifying includes:

acquiring density of the training data set in the feature space; and specifying, for each training cluster of the plurality of training clusters, a piece of the input data with a highest density as the representative point for the training cluster.

3. The non-transitory computer-readable storage medium according to claim 2, wherein the process further comprising:

acquiring the density of the input data set in the feature space;

acquiring a number of pieces of the plurality of input clusters based on a number of pieces of zero-dimensional connection information equal to or greater than a certain value obtained by extracting one or more pieces of the input data set that corresponds to the density equal to or higher than a threshold value and executing a persistent homology conversion process on the extracted one or more pieces of the input data set;

acquiring the number of the plurality of input clusters while altering the threshold value until the number of the plurality of input clusters coincides with the number of the representative points;

specifying each of the plurality of input clusters with respect to the input data set based on the number of the plurality of input clusters; and giving the labels that correspond to the specified each of the plurality of input clusters to the input data set.

4. The non-transitory computer-readable storage medium according to claim 3, wherein the setting includes:

specifying, for each of a plurality of input data groups, each input data group being a set of the input data that includes a plurality of pieces of the zero-dimensional connection information equal to or greater than the certain value when the number of the input clusters coincides with the number of the representative points, the piece of the input data with the highest density as a representative points for the each input data group; and associating the plurality of input clusters to each of the plurality of input data groups based on the correspondence relationship between specified representative point for the each input data group and each of the representative points of the training cluster, wherein the giving includes giving the labels that correspond to the each of the plurality of associated input clusters to each of the plurality of input data groups.

5. The non-transitory computer-readable storage medium according to claim 4, wherein the setting includes:

acquiring, for input data that does not belong to the input data groups, distances from the representative points based on the density; and associating the plurality of input clusters with a closest distance among the distances from the representative points to input data set that does not belong to the input data set when a second closest distance among the distances from the representative points is longer than a maximum value among distances between the representative points, wherein the giving includes giving the labels that correspond to the plurality of associated input clusters to the input data set that does not belong to the input data groups.

6. The non-transitory computer-readable storage medium according to claim 5, wherein the setting includes acquiring probabilities of belonging to each of the plurality of input clusters by a probabilistic approach based on a certain condition when the second closest distance is shorter than the maximum value among the distances between the representative points, and the giving includes giving, as the labels, probabilistic labels derived from the probabilities of belonging to each of the plurality of input clusters, to the data that does not belong to the input data groups.

7. The non-transitory computer-readable storage medium according to claim 6, wherein the acquiring includes acquiring combinations of the input data set and the probabilistic labels, and the process further includes:

acquiring an element-wise product of: a first matrix based on determination results obtained by inputting the acquired input data set to the machine learning model and a second matrix based on the probabilistic labels, and when a value obtained by dividing the element product by the number of pieces of the input data set is less than a threshold value, detecting accuracy deterioration of the machine learning model.

8. The non-transitory computer-readable storage medium according to claim 7, wherein the re-training includes re-training the machine learning model by using, as the supervised learning data, the acquired combinations of the input data set and the probabilistic labels when the accuracy deterioration of the machine learning model is detected.

9. An estimation method for a computer of retraining a machine learning model using, as supervised learning data, data with labels each of which is targeted for estimation and assigned by a clustering technique, the estimation method comprising:

specifying, for each training cluster of a plurality of training clusters, a representative point from among a plurality of points included in the each training cluster to obtain a plurality of representative points for the plurality of training clusters, each of the plurality of training clusters identifiably corresponding to one of the labels targeted for estimation, the plurality of training clusters being generated by clustering, in a feature space, a training data set used in a training phase for training of the machine learning model that estimates the labels according to input data in the training data set, wherein a number of the plurality of training clusters is equal to a number of the labels targeted for estimation;

setting boundaries between each of a plurality of input clusters under a condition that a number of the plurality of input clusters and the number of the representative points coincide with each other, the plurality of input clusters being generated by clustering, in the feature space, an input data set used in an operation phase of the trained machine learning model;

acquiring estimation results for the labels with respect to the input data based on a correspondence relationship between the plurality of input clusters and the plurality of training clusters after the setting of the boundaries; and re-training the machine learning model using, as the supervised learning data, a combination of the input data set and labels derived from the estimation results.

10. An estimation device of retraining a machine learning model using, as supervised learning data, data with labels each of which is targeted for estimation and assigned by a clustering technique, the estimation device comprising:

one or more memories; and one or more processors coupled to the one or more memories and the one or more processors configured to:

specify, for each training cluster of a plurality of training clusters, a representative point from among a plurality of points included in the each training cluster to obtain a plurality of representative points for the plurality of training clusters, each of the plurality of training clusters identifiably corresponding to one of the labels targeted for estimation, the plurality of training clusters being generated by clustering, in a feature space, a training data set used in a training phase for training of the machine learning model that estimates the labels according to input data in the training data set, wherein a number of the plurality of training clusters is equal to a number of the labels targeted for estimation, set boundaries between each of a plurality of input clusters under a condition that a number of the plurality of input clusters and the number of the representative points coincide with each other, the plurality of input clusters being generated by clustering, in the feature space, an input data set used in an operation phase of the trained machine learning model, acquire estimation results for the labels with respect to the input data set based on a correspondence relationship between the plurality of input clusters and the plurality of training clusters after the setting of the boundaries, and re-training the machine learning model using, as the supervised learning data, a combination of the input data set and labels derived from the estimation results.

* * * * *